US008865030B2

(12) United States Patent
Koplin et al.

(10) Patent No.: US 8,865,030 B2
(45) Date of Patent: Oct. 21, 2014

(54) MICROCAPSULES HAVING A RADIATION-INDUCED OR THERMAL RELEASE

(75) Inventors: Tobias Joachim Koplin, Ludwigshafen (DE); Simon Nord, Karlsruhe (DE); Ulrike Licht, Mannheim (DE); Cornelis Petrus Beyers, Altrip (DE); Tina Schroeder-Grimonpont, Rheinzabern (DE); Karl-Heinz Schumacher, Neustadt (DE)

(73) Assignee: BASF SE, Ludwigshafen (DE)

( * ) Notice: Subject to any disclaimer, the term of this patent is extended or adjusted under 35 U.S.C. 154(b) by 457 days.

(21) Appl. No.: 12/921,683

(22) PCT Filed: Mar. 9, 2009

(86) PCT No.: PCT/EP2009/052696
§ 371 (c)(1),
(2), (4) Date: Sep. 9, 2010

(87) PCT Pub. No.: WO2009/112442
PCT Pub. Date: Sep. 17, 2009

(65) Prior Publication Data
US 2011/0024035 A1 Feb. 3, 2011

(30) Foreign Application Priority Data

Mar. 11, 2008 (EP) .................................. 08152583
Jun. 19, 2008 (EP) .................................. 08158620

(51) Int. Cl.
*F21V 9/06* (2006.01)
*B32B 38/00* (2006.01)
*C09D 5/32* (2006.01)
*B01J 13/02* (2006.01)
*C09J 163/00* (2006.01)

(52) U.S. Cl.
CPC . *B01J 13/02* (2013.01); *C09D 5/32* (2013.01); *C09J 163/00* (2013.01)
USPC ....................................... 252/589; 156/275.7

(58) Field of Classification Search
CPC ........... B32B 38/00; B32B 37/12; C08F 2/00; C08F 2/32; C09J 1/00; C09J 4/06; C09J 11/00; C09J 11/04; C09J 11/06; B01J 13/14; B01J 13/20
USPC .......................... 156/275.7, 344, 330; 252/589
See application file for complete search history.

(56) References Cited

U.S. PATENT DOCUMENTS

| 4,191,404 | A | 3/1980 | Lee et al. |
| 5,108,654 | A | 4/1992 | Ragaini |
| 5,596,051 | A | 1/1997 | Jahns et al. |
| 6,200,681 | B1 | 3/2001 | Jahns et al. |
| 6,346,590 | B1 | 2/2002 | Campbell et al. |
| 2006/0073334 | A1 * | 4/2006 | Schwantes et al. ........ 428/402.2 |
| 2007/0021533 | A1 * | 1/2007 | Yan et al. ...................... 523/200 |
| 2007/0224899 | A1 | 9/2007 | Dungworth |
| 2010/0065209 | A1 | 3/2010 | Burghardt et al. |
| 2010/0092774 | A1 | 4/2010 | Schoecker et al. |

FOREIGN PATENT DOCUMENTS

| CN | 1927443 | 3/2007 |
| CN | 1946475 | 4/2007 |
| DE | 39 18 141 | 12/1990 |
| DE | 43 08 079 | 9/1994 |
| DE | 44 19 518 | 12/1995 |
| DE | 44 35 422 | 4/1996 |
| DE | 44 35 423 | 4/1996 |
| DE | 199 16 663 | 10/2000 |
| DE | 100 62 641 | 6/2002 |
| DE | 101 39 171 | 2/2003 |
| DE | 103 30 749 | 1/2005 |
| DE | 10 2004 063 380 | 7/2006 |
| EP | 1 029 018 | 8/2000 |
| EP | 1 321 182 | 6/2003 |
| EP | 1 269 973 | 10/2005 |
| EP | 1 269 940 | 1/2006 |
| GB | 2 250 930 | 6/1992 |
| WO | 91 12883 | 9/1991 |

(Continued)

OTHER PUBLICATIONS

International Search Report issued Jun. 23, 2009 in PCT/EP09/052696 filed Mar. 9, 2009.
U.S. Appl. No. 12/517,481, filed Jun. 3, 2009, Burghardt, et al.
U.S. Appl. No. 12/522,384, filed Jul. 8, 2009, Schoecker, et al.
U.S. Appl. No. 12/812,325, filed Jul. 9, 2010, Hentze, et al.
U.S. Appl. No. 13/383,334, filed Jan. 10, 2012, Jung, et al.

(Continued)

*Primary Examiner* — Daniel McNally
(74) *Attorney, Agent, or Firm* — Oblon, Spivak, McClelland, Maier & Neustadt, L.L.P.

(57) ABSTRACT

The present invention relates to microcapsules comprising a capsule core comprising a lipophilic substance and also at least one compound which absorbs electromagnetic radiation from the wavelength range from 700 nm to 1 m, and a capsule wall synthesized from 40 to 80% by weight of one or more monomers (monomers I) selected from $C_1$-$C_{24}$ alkyl esters of acrylic and/or methacrylic acid, acrylic acid, methacrylic acid, and maleic acid, 20 to 60% by weight of one or more di- or polyfunctional monomers (monomers II) which are sparingly soluble or insoluble in water, and 0 to 40% by weight of one or more other monomers (monomers III), based in each case on the total weight of the monomers, and also to microcapsules comprising at least one epoxy tackifier resin and if desired a compound which absorbs electromagnetic radiation from the wavelength range from 700 nm to 1 m, to a process for preparing them, to their use in pressure sensitive adhesives, and also to a method of adhesively bonding at least two substrates.

33 Claims, No Drawings

(56) References Cited

FOREIGN PATENT DOCUMENTS

| WO | 91 12884 | 9/1991 |
| WO | 99 24525 | 5/1999 |
| WO | 99 45251 | 9/1999 |
| WO | 01 49817 | 7/2001 |
| WO | 02 20683 | 3/2002 |
| WO | 02 48278 | 6/2002 |
| WO | 02 076988 | 10/2002 |
| WO | 03 054102 | 7/2003 |
| WO | 03 068703 | 8/2003 |
| WO | 2004 076578 | 9/2004 |
| WO | WO 2005/105291 | 11/2005 |
| WO | 2006 092409 | 9/2006 |
| WO | 2006 136574 | 12/2006 |
| WO | 2008 064999 | 6/2008 |
| WO | WO 2008064999 A2 * | 6/2008 |
| WO | 2009 071499 | 6/2009 |

OTHER PUBLICATIONS

U.S. Appl. No. 13/505,390, filed May 1, 2012, Gerst, et al.

Office Action issued Nov. 5, 2012, in Chinese patent application No. 200980108699.0 (English translation).

Andre G. Skirtach, et al., "Laser-Induced Release of Encapsulated Materials inside Living Cells", Angew. Chem. Int. Ed, vol. 45, 2006, pp. 4612-4617.

* cited by examiner

MICROCAPSULES HAVING A RADIATION-INDUCED OR THERMAL RELEASE

The present invention relates to microcapsules comprising a capsule wall based on polymethacrylates and a capsule core comprising a lipophilic substance, which can be released in a radiation induced or thermal manner, to a process for preparing them, and to their use for the radiation-induced or thermal release of the lipophilic substance.

Microcapsules are known in a wide variety of embodiments and are used for very different purposes according to the imperviousness of the capsule wall. They are employed, for example, to protect core materials which are to be released only by deliberate mechanical destruction of the capsule wall, such as to protect dyes for carbonless copy papers or to protect encapsulated fragrances. In such fields of application, known capsule wall materials include materials based on gelatin, on polyurethane, and on polyurea, and also materials based on polyacrylates and polymethacrylates. Other requirements are imposed on wall materials for crop or pharmaceutical actives as core materials, where the key factor is the permeability of the capsule wall, allowing controlled release and the targeted transport of the actives.

One relatively new field of application for microcapsules is their use in adhesive formulations. There have been a wide variety of approaches to improving adhesive formulations or to deliberately encapsulating adhesives or components. As a general rule, adhesives must both be tacky and exhibit strength. Heating to relatively high temperatures often leads to softening of the adhesives and to a drop in strength. There are applications, however, in which it is important that the strength does not drop even at relatively high temperatures. One solution to this problem is the addition of a crosslinker component which imparts additional strength.

U.S. Pat. No. 5,596,051 describes microcapsules having poly-n-butyl acrylate as core material and a copolymer of methyl methacrylate and methacrylic anhydride as wall material. In that case the wall is opened by adding bases, which undo the crosslinking chemically and/or cause swelling of the anhydride groups and thus permit the escape of the tackifier resin.

DE 3918141 teaches microcapsules with capsule walls of difunctional acids or acid derivatives and hexamethylene tetramine or acetaldehyde-ammonia derivatives as crosslinkers. The incorporated hexamethylenetetramine or the acetaldehyde-ammonia derivative is thermolabile and therefore constitutes a deliberate weak point in the capsule wall which under thermal induction effects the release of the active substance.

WO 91/12883 and WO 91/12884 teach photolabile and thermolabile microcapsules, respectively, with capsule walls of polyurea. Included in the wall polymer as deliberate weak points are azo groups or peroxide groups which, under photochemical or thermal initiation, lead to the opening of the capsule wall. The incorporation of deliberate weak points of this kind necessitates specific monomers, which do not allow an arbitrary process regime, particularly not at relatively high temperatures.

WO 02/20683 teaches a microencapsulated acrylate adhesive which is not formed until during the encapsulation process. Wall materials specified include polyurea resins and alkyl acrylate/acrylic acid copolymers. Release takes place by means of pressure or heat. However, depending on the application, it can be a disadvantage that the parts to be bonded must be heated as a whole.

The earlier European applications 06126997.3 and 06126994.0 thus disclose thermally destructible microcapsules for a dispersion of laminating adhesive. The microcapsule walls described therein, based on polymethyl methacrylate, become permeable to the carbodiimides contained in the core, in general at temperatures above 60° C., and so bring about the subsequent crosslinking of the laminating adhesives.

An object of the present invention was to provide a further adhesive system in which the crosslinker component can be released in a targeted and thermally controlled manner.

WO 03/054102 describes adhesives which comprise at least one metal mixed oxide in the form of superparamagnetic, nanoscale particles, and also methods of heating such preparations with the aim of producing or undoing adhesive bonds based on said preparations. Hence, according to one variant embodiment, the component that triggers the curing, such as a monomer or catalyst, can be dispersed in an adhesive composition in the form of microcapsules which comprise superparamagnetic, nanoscale particles as the capsule core, and can be released by irradiation.

WO 02/48278 teaches a 1-part embodiment of a two-component adhesive, wherein one component, component A, is in microencapsulated form and the microcapsules are in distribution in a matrix of the second component, component B. Irradiation with light of a wavelength of 200-700 nm releases component A and forms the adhesive.

WO 2004/076578 teaches hotmelt adhesives comprising pigments or dyes which absorb in the near-infrared region. The tack can be reactivated by irradiation in the near-infrared region, by introducing energy at the irradiated sites until the adhesive has melted.

A particular set of problems is encountered with adhesives of the kind known from label adhesives, on account of their permanent tack. When processing such adhesives, there is a need—in order to protect the bond area—for specially coated papers, which are not removed until the adhesive effect is desired. In that case the protective papers become waste.

A further object of the present invention were new adhesive systems which allow targeted control over the adhesive effect in terms both of time and of space. The intention more particularly is to make liquid adhesives or liquid precursors of adhesives resistant to blocking, i.e., tack-free, and to re-acquire their tack only at a point in time chosen arbitrarily by the user, and only at the sites desired by the user.

A further object of the present invention was to provide new microcapsules with which it is possible to control the release of the contents in a targeted way, spatially and temporally. Such capsules ought to possess impervious capsule walls, not only in aqueous dispersion but also in dried form, such as a film or powder, for example. The energy density required for the release ought to be as low as possible and ought to be provided by radiation sources which are easy to operate, such as microwave devices and IR emitters.

Found accordingly have been microcapsules whose capsule wall releases the capsule core contents by irradiation with electromagnetic radiation selected from the wavelength range from 700 nm to 1 m.

Furthermore found have been microcapsules whose capsule wall releases the capsule core contents by thermal heating.

The present invention provides microcapsules comprising a capsule core comprising at least one lipophilic substance and also at least one compound which absorbs electromag netic radiation from the wavelength range from 700 nm to 1 m, and a capsule wall synthesized from 40 to 80% by weight of one or more monomers (monomers I) selected from $C_1$-$C_{24}$ alkyl esters of acrylic and/or methacrylic acid, acrylic acid, methacrylic acid, and maleic acid, 20 to 60% by weight of one or more di- or polyfunctional monomers (monomers II) which are sparingly soluble or insoluble in water, and 0 to 40% by weight of one or more other monomers (monomers III), based in each case on the total weight of the monomers, and also a process for preparing them. Additionally it has been found that lipophilic substances encapsulated in this way can be released under radiation induction. The specification further provides for the use of these microcapsules for adhesive systems, and also provides a method of adhesively bonding at least two substrates.

The microcapsules of the invention comprise a capsule core and a capsule wall made of polymer. The capsule core is composed predominantly, to an extent of more than 90% by weight, of lipophilic substance. The capsule core may be either solid or liquid, depending on the temperature. The capsule core is preferably liquid at a temperature of 20° C. under atmospheric pressure. By liquid is meant that the core material has a Brookfield viscosity of ≤5 Pa·s.

The average particle size of the capsules (by means of light scattering) is 0.5 to 50 μm, preferably 0.5 to 30 μm. The weight ratio of capsule core to capsule wall is generally from 50:50 to 95:5. A core/wall ratio of 70:30 to 93:7 is preferred.

Depending on the preparation process and on the protective colloid chosen in that case, said protective colloid may likewise be part of the microcapsules. Thus it is possible for up to 10% by weight, based on the total weight of the microcapsules, to be protective colloid. In this embodiment the microcapsules have the protective colloid on the surface of the polymer.

Suitable core materials for the microcapsules are compounds which are insoluble in water or substantially insoluble in water, these being referred to below as lipophilic substances. Substantially insoluble in water entails a solubility of the lipophilic substance in water of ≤5 g/l, preferably ≤1 g/l at 25° C. The capsule core may comprise one or more lipophilic substances. Where the lipophilic substance is a mixture, it may be present, for example, in the form of a solution. Lipophilic substances having the above-stated water solubility are preferably selected from the group comprising aliphatic and aromatic hydrocarbon compounds, saturated or unsaturated $C_6$-$C_{30}$ fatty acids, fatty alcohols, $C_6$-$C_{30}$ fatty amines, fatty acid esters, natural and synthetic waxes, halogenated hydrocarbons, natural oils, plasticizers, crosslinkers for two-component adhesives, tackifier resins and tackifying resins for two-component adhesives, fragrances and flavors, actives, dyes and/or color formers whose absorption maximum lies at a wavelength <700 nm, catalysts, and inhibitors.

Mention may be made, by way of example, of the following:

a) aliphatic hydrocarbon compounds such as saturated or unsaturated $C_7$-$C_{40}$ hydrocarbons, which are branched or, preferably, linear, examples being those such as n-heptane, n-octane, n-nonane, n-decane, n-undecane, n-dodecane, n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane, and white oil, and also cyclic hydrocarbons, examples being cyclohexane, cyclooctane, and cyclodecane;

b) aromatic hydrocarbon compounds such as benzene, naphthalene, biphenyl, o- or m-terphenyl, $C_1$-$C_{40}$ alkyl-substituted aromatic hydrocarbons such as dodecylbenzene, tetradecylbenzene, hexadecylbenzene, hexylnaphthalene or decylnaphthalene;

c) saturated or unsaturated $C_6$-$C_{30}$ fatty acids such as lauric, stearic, oleic or behenic acid, preferably eutectic mixtures of decanoic acid with, for example, myristic, palmitic or lauric acid;

d) fatty alcohols such as lauryl, stearyl, oleyl, myristyl or cetyl alcohol, mixtures such as coconut fatty alcohol, and also the alcohols known as oxo-process alcohols, which are obtained by hydroformylation of α-oefins and further reactions;

e) $C_6$-$C_{30}$ fatty amines, such as decylamine, dodecylamine, tetradecylamine or hexadecylamine;

f) esters such as $C_1$-$C_{10}$ alkyl esters of fatty acids, such as propyl palmitate, methyl stearate or methyl palmitate, and also, preferably, their eutectic mixtures, or methyl cinnamate;

g) natural and synthetic waxes such as montan acid waxes, montan ester waxes, carnauba wax, polyethylene wax, oxidized waxes, polyvinyl ether wax, ethylene-vinyl acetate wax or hard waxes from Fischer-Tropsch processes;

h) halogenated hydrocarbons such as chlorinated paraffin, bromoctadecane, bromopentadecane, bromononadecane, bromoeicosane, and bromodocosane;

i) natural oils such as peanut oil and soybean oil;

j) plasticizers such as mono-, di-, and polyesters of organic carboxylic acids;

k) crosslinkers for two-component adhesives, if desired in the form of a solution in the abovementioned lipophilic substances of groups a) to j); such as aziridines, epoxides, oxazolines, isocyanates, oximes, carbodiimides or other reactive, polyfunctional compounds such as acids, alcohols, alkoxylates, and amines, l) tackifier resins for two-component adhesives, if desired in the form of a solution in the abovementioned lipophilic substances of groups a) to j), such as epoxy resins, epoxyacrylate resin, polyolefin resins; polyurethane prepolymers and silicone resins, and also tackifying resins, if desired in the form of a solution in the abovementioned lipophilic substances of groups a) to j), such as natural and synthetic resins, examples being hydrocarbon resins, modified rosins, pinene resins, and terpene resins;

m) fragrances and flavors, if desired in the form of a solution in the abovementioned lipophilic substances of groups a) to i), as described in WO 01/49817, or in "Flavors and Fragrances", Ullmann's Encyclopedia of Industrial Chemistry, Wiley-VCH, 2002, hereby incorporated by reference;

n) actives such as biocides, actives against endo- and ectoparasites, herbicides, fungicides, algicides, actives against animal pests, such as insecticides, acaricides, nematicides, molluscicides, and actives against mites, and also safeners, if appropriate in the form of a solution in the abovementioned lipophilic substances of groups a) to i), as described in WO 2006/092409;

o) additionally, solutions of dyes and/or color formers whose absorption maximum lies at a wavelength <700 nm, in the abovementioned lipophilic substances of groups a) to i);

p) catalysts and inhibitors.

Preferred lipophilic substances are tackifier resins for two-component adhesives, tackifying resins, crosslinkers for two-component adhesives, fragrances and flavors, actives, dyes and/or color formers whose absorption maximum lies at a wavelength <700 nm, in each case, if desired, in the form of a solution in the abovementioned lipophilic substances of groups a) to i).

With particular preference the lipophilic substance is a crosslinker for two-component adhesives or a tackifier resin for two-component adhesives. Examples of preferred tackifier resins are epoxy resins and epoxy acrylate resins which are starting materials for reactive adhesives.

Epoxy tackifier resins are described in the book by C. A. May "Epoxy resins", $2^{nd}$ edition, Marcel Dekker, Inc and also in "Epxoy Resins, Curing Agents, Compounds and Modifiers", $2^{nd}$ edition, Flick, E. W. 1993. Suitable epoxy resins are diepoxy or polyepoxy resins, more particularly those having an average molecular weight 5000 g/mol. They are available, for example, under the name Araldite® from Huntsman International LLC. Likewise preferred are epoxide acrylate resins, preferably having an average molecular weight ≤25 000, as described in more detail below in the context of the encapsulated epoxy tackifier resins. Preferred resins are those based on glycidyl acrylates and glycidyl methacrylates. Preferred starting monomers for these resins are glycidyl acrylate and/or glycidyl methacrylate, acrylic esters, styrene, and hydroxyalkyl acrylates. Such products are available under the name Joncryle ADR from BASF SE.

Carbodiimides suitable as crosslinkers k) comprise in general on average 1 to 20, preferably 1 to 15, more preferably 2 to 10 carbodiimide groups. The number-average molar weight $M_n$ of the carbodiimide compounds is preferably 100 to 10 000, more preferably 200 to 5000, and very preferably 500 to 2000 g/mol. The number-average molecular weight is determined by endgroup analysis of the diisocyanates (i.e., consumption of the isocyanate groups by carbodiimide formation, see below) or, if endgroup analysis is not a possibility, by gel permeation chromatography (polystyrene standard, THF as eluent).

Carbodiimide groups are readily obtainable from two isocyanate groups with elimination of carbon dioxide:

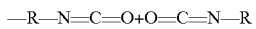

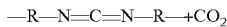

Starting from polyisocyanates, or diisocyanates, it is possible in this way to obtain carbodiimides having two or more carbodiimide groups and, if desired, isocyanate groups, more particularly terminal isocyanate groups. Carbodiimides that are suitable as crosslinkers are described in DE 10 2004 063 380, for example, hereby incorporated by reference.

Suitability as crosslinkers k) is possessed by diisocyanates, such as diisocyanates of the general formula $X(NCO)_2$, where X is an aliphatic hydrocarbon radical having 4 to 12 carbon atoms, a cycloaliphatic or aromatic hydrocarbon radical having 6 to 15 carbon atoms or an araliphatic hydrocarbon radical having 7 to 15 carbon atoms.

Preferred crosslinkers k) are difunctional and polyfunctional amines containing primary, secondary or tertiary amino groups and having a water solubility <5 g/l at a temperature of 50° C.

Preferred crosslinkers k) are also diepoxides and polyepoxides.

Owing to the affinity of the absorber for the core material, the absorber is predominantly mixed with the core material and/or incorporated into the capsule wall.

A distinction is made here between organic and inorganic absorbers, which depending on the wavelengths absorbed are subdivided still further into absorbers for IR and absorbers for microwave:
 organic IR absorbers
 organic microwave absorbers
 inorganic IR absorbers
 inorganic microwave absorbers According to one embodiment, preferred microcapsules are those in which the compound which absorbs electromagnetic radiation from the wavelength range from 700 nm to 1 m is an organic absorber.

According to another embodiment, preferred microcapsules are those in which the compound which absorbs electromagnetic radiation from the wavelength range from 700 nm to 1 m is an inorganic absorber.

An IR absorber for the purposes of this specification is a compound which when applied in a film thickness of 50 μm exhibits an absorption ≥90% at at least one wavelength of radiation in the wavelength range from 700 nm to 1 mm. Preference is given to the wavelength range from >700 nm to 2000 nm, and also to the wavelengths 9.6 μm and 10.6 μm.

A microwave absorber for the purposes of this specification is a compound which absorbs microwaves in the wavelength range from >1 mm to 1 m. Particular preference is given to the technically relevant frequencies of 2.45 GHz, 433-444 MHz, and 902-928 MHz.

Organic IR absorbers are diversely described in the literature. Compounds of this kind comprise cyanines, metal complexes, quinones, azo dyes, multiphenylmethane, perylenes, quaterrylenes, aromatic annulenes, and, in particular, metal phthalocyanines, metal naphthalocyanines, metal porphyrins, terrylimides and quaterrylimides. Compounds with parent structures of these kinds are, depending on the substituents, either soluble in solvents—in other words are dyes—or are insoluble and are therefore pigments. By way of example, mention may be made of IR absorbers of the kind described in WO 02076988. Particular preference is given to Lumogen® IR 765 and 788 from BASF Aktiengesellschaft.

Organic microwave absorbers are described in, for example, the earlier European application 07 106 445.5, hereby incorporated by reference.

Inorganic microwave absorbers are metal oxides which possess a magnetic moment, and also carbon black and graphite. In general the compounds also absorb IR radiation, and so the listing is valid for both forms of excitation.

Suitable inorganic absorbers are particles with an average size in the range from 0.1 to 5 μm which are electrically conducting, magnetic, ferrimagnetic, ferromagnetic, antiferromagnetic or superparamagnetic. The application of an additional static magnetic field leads to improved absorption by these particles (typical field strengths are 10-60 mtesla). Mention may be made, by way of example, of metals, including transition metals, such as Al, Fe, Zn, Ti or Cu, their salts, their oxides for example, such as ZnO, iron oxides, especially ferrites, and TiO2, carbonates or sulfides, carbon such as graphite, carbon black, nanoparticulate carbon or nanotubes, silicon carbides, silicon, alkali metal salts and alkaline earth metal salts, etc. Suitability is further possessed by the metal mixed oxides specified in WO 03/054102, hereby incorporated by reference.

Preference is given to carbon black, $Fe_3O_4$, and graphite.

In one embodiment, microcapsules having a capsule core comprising lipophilic substance, more preferably tackifier resins for two-component adhesives or crosslinkers for two-component adhesives, and also at least one organic absorber are preferred.

In another embodiment, microcapsules having a capsule core comprising lipophilic substance, more preferably tackifier resins for two-component adhesives or crosslinkers for two-component adhesives, and also at least one inorganic absorber are preferred.

Where they are inorganic particles such as carbon black or $Fe_3O_4$, the absorber particles are in dispersion in the lipophilic substance of the capsule core. Where the absorber particles are present in dispersion, they ought to have a particle size ≤5 μm, preferably ≤2 μm.

Depending on the nature of the absorber and on the form of activation, the microcapsules of the invention comprise not more than 10% by weight of absorber, preferably 0.01% to 10% by weight, more particularly 0.1% to 7% by weight, very preferably 1% to 5% by weight of absorber, based on the total amount of lipophilic substance and capsule wall monomers.

The capsule wall is substantially synthesized from 40 to 80% by weight of one or more monomers (monomers I) selected from $C_1$-$C_{24}$ alkyl esters of acrylic and/or methacrylic acid, acrylic acid, methacrylic acid, and maleic acid, 20 to 60% by weight of one or more di- or polyfunctional monomers (monomers II) which are sparingly soluble or insoluble in water, and 0 to 40% by weight of one or more other monomers (monomers III), based in each case on the total weight of the monomers.

Preferably the capsule wall is substantially synthesized from 40 to 80% by weight of one or more monomers (monomers I) selected from $C_1$-$C_{24}$ alkyl esters of acrylic and/or methacrylic acid, acrylic acid, methacrylic acid, and maleic acid, 20 to 60% by weight of one or more di- or polyfunctional monomers (monomers II) which are sparingly soluble or insoluble in water, and 0 to 40% by weight of one or more other monomers (monomers III), based in each case on the total weight of the monomers, the monomers I comprising 10 to 90% by weight, based on the total amount of the monomers I, of at least one monomer Ia whose homopolymer has a glass transition temperature ($T_g$) of ≤60° C., preferably ≤20° C., more preferably ≤−20° C.

The polymers of the capsule wall comprise in general at least 40%, in a preferred form at least 50%, in a particularly preferred form at least 60%, and also up to 80% by weight of one, or preferably, two or more monomers I selected from $C_1$-$C_{24}$ alkyl esters of acrylic acid and/or methacrylic acid, acrylic acid, methacrylic acid and/or maleic acid in copolymerized form, based on the total weight of the monomers.

These monomers I comprise preferably 10% to 70% by weight, more particularly 15% to 50% by weight, based on the total amount of the monomers I, of at least one monomer Ia.

The glass transition temperature ($T_g$) of a polymer is defined in the Encyclopedia of Chemical Technology, volume 19, 4th edition, page 891, as the temperature below which the Brownian molecular motions of relatively long chain segments (20-50 chain atoms) of the polymers are frozen. Below its glass transition temperature, a polymer exhibits neither flow behavior nor rubber-elasticity. The glass transition temperature is determined by means of DSC in accordance with DIN 53765: 1994-03.

The polymers of the capsule wall comprise in general at least 20%, in a preferred form at least 25%, in a particularly preferred form at least 30%, and also up to 60%, preferably up to 50%, by weight of one or more di- or polyfunctional monomers (monomers II) of low to zero solubility in water, in copolymerized form, based on the total weight of the monomers.

In addition the polymers may comprise in copolymerized form up to 40%, preferably up to 30%, more particularly up to 20% by weight of other monomers, monomers III. With particular preference they comprise less than 5% by weight of other monomers III in copolymerized form. With very particular preference the capsule wall is composed only of the monomers I and II.

Suitable monomers I are the $C_1$-$C_{24}$ alkyl esters of acrylic and/or methacrylic acid. Also suitable are the unsaturated $C_3$ and $C_4$ carboxylic acids such as acrylic acid, methacrylic acid, and maleic acid. Examples include methyl, ethyl, n-propyl, isopropyl, n-butyl, isobutyl, sec-butyl, and tert-butyl acrylate and also methyl, ethyl, n-propyl, isopropyl, n-butyl, isobutyl, sec-butyl and tert-butyl methacrylate.

The monomers Ia are a subgroup of the monomers I. Suitable monomers Ia, whose homopolymers have a glass transition temperature ($T_g$) of 60° C., are, for example, the $C_1$-$C_{24}$ alkyl esters of acrylic acid and butyl methacrylate. Examples include methyl acrylate, ethyl acrylate, propyl acrylate, n-butyl acrylate, t-butyl acrylate, n-pentyl acrylate, 2-methylbutyl acrylate, 3-methylbutyl acrylate, hexyl acrylate, ethylhexyl acrylate, and propylheptyl acrylate. Preference is given to n-butyl acrylate.

Suitable monomers II are di- or polyfunctional monomers which are sparingly soluble or insoluble in water but have a good to limited solubility in the lipophilic substance. By low solubility is meant a solubility of less than 60 g/l at 20° C. By di- or polyfunctional monomers are meant compounds which have at least two nonconjugated ethylenic double bonds. Principally suitable are divinyl and polyvinyl monomers, which bring about crosslinking of the capsule wall during the polymerization.

Suitable divinyl monomers are divinylbenzene and divinylcyclohexane. Preferred divinyl monomers are the diesters of diols with acrylic acid or methacrylic acid, and also the diallyl and divinyl ethers of these diols. Examples include ethanediol diacrylate, ethylene glycol dimethacrylate, 1,3-butylene glycol dimethacrylate, methallylmethacrylamide, allyl acrylate, and allyl methacrylate. Particularly preferred are propanediol, butanediol, pentanediol, and hexanediol diacrylates and the corresponding methacrylates.

Preferred polyvinyl monomers are the polyesters of polyols with acrylic acid and/or methacrylic acid, and also the polyallyl and polyvinyl ethers of these polyols, and also trivinylbenzene and trivinylcyclohexane. Those preferred are trimethylolpropane triacrylate and trimethacrylate, pentaerythritol triallyl ether, pentaerythritol tetraallyl ether, pentaerythritol triacrylate, and pentaerythritol tetraacrylate, and also their technical mixtures.

Suitable other monomers III are monoethylenically unsaturated monomers other than the monomers I. Preference is given to monomers IIIa such as vinyl acetate, vinyl propionate, and vinylpyridine.

Particular preference is given to the water-soluble monomers IIIb, examples being acrylonitrile, methacrylamide, hydroxyethyl acrylate, hydroxyethyl methacrylate, itaconic acid, maleic anhydride, N-vinylpyrrolidone, 2-hydroxyethyl acrylate and methacrylate, and acrylamido-2-methylpropanesulfonic acid. In addition, mention may be made more particularly of N-methylolacrylamide, N-methylolmethacrylamide, dimethylaminoethyl methacrylate, and diethylaminoethyl methacrylate.

The microcapsules of the invention can be prepared by what is called an in situ polymerization. The principle of microcapsule formation is based on the use of the monomers, a free-radical initiator, a protective colloid, and the lipophilic substance for encapsulation to prepare a stable oil-in-water emulsion. Stable in this case means that over a period of 2 hours there is no separation of the oil-in-water emulsion. Then the polymerization of the monomers is triggered by heating and is controlled if desired by raising the temperature further, with the resulting polymers forming the capsule wall that envelops the lipophilic substance. This general principle is described for example in DE-A 101 39 171, whose content is hereby expressly incorporated by reference.

The microcapsules are generally produced in the presence of at least one organic or inorganic protective colloid. Both organic and inorganic protective colloids may be ionic or neutral. Protective colloids may be used either individually or in mixtures of two or more protective colloids each with the same or different charge.

Organic protective colloids are preferably water-soluble polymers which lower the surface tension of water from a maximum of 73 mN/m to 45 to 70 mN/m and so ensure the formation of coherent capsule walls, and also form microcapsules preferably having particle sizes in the range from 0.5 to 50 µm, preferably 0.5 to 30 µm, in particular 0.5 to 10 µm.

Examples of organic neutral protective colloids are cellulose derivatives such as hydroxyethylcellulose, methylhydroxyethylcellulose, methylcellulose, and carboxy-methylcellulose, polyvinylpyrrolidone, vinylpyrrolidone copolymers, gelatin, gum arabic, xanthan, casein, polyethylene glycols, polyvinyl alcohol and partially hydrolyzed polyvinyl acetates, and also methylhydroxypropylcellulose. Preferred organic neutral protective colloids are polyvinyl alcohol and partially hydrolyzed polyvinyl acetates, and methylhydroxypropylcellulose.

Generally speaking, polyvinyl alcohol or partially hydrolyzed polyvinyl acetate is used in a total amount of 0.5-15% by weight, preferably 1-8% by weight and more preferably of 1.5-4% by weight, based on the microcapsules (without protective colloid). However, it is also possible to use it in a total amount of at least 3% by weight, preferably from 6% to 8% by weight. In this context it is possible to add further aforementioned protective colloids in addition to the preferred amounts of polyvinyl alcohol or partially hydrolyzed polyvinyl acetate. The microcapsules are preferably produced only with polyvinyl alcohol and/or partially hydrolyzed polyvinyl acetate and without addition of further protective colloids. Likewise preferred are mixtures of polyvinyl alcohol and/or partially hydrolyzed polyvinyl acetate with cellulose derivaties, particularly methylhydroxypropyl cellulose.

Polyvinyl alcohol is obtainable by polymerizing vinyl acetate, in the presence if appropriate of comonomers, and hydrolyzing the polyvinyl acetate, with elimination of the acetyl groups and formation of hydroxyl groups. The degree of hydrolysis of the polymers may for example be 1% to 100% and is situated preferably in the range from 50% to 100%, in particular from 65% to 95%. By partially hydrolyzed polyvinyl acetates is meant in the context of this specification a degree of hydrolysis of <50% and, by polyvinyl alcohol, of ≥50% to 100%. The preparation of homopolymers and copolymers of vinyl acetate and the hydrolysis of these polymers to form polymers comprising vinyl alcohol units is common knowledge. Polymers comprising vinyl alcohol units are sold for example as Mowiol® products by Kuraray Specialities Europe (KSE).

Preferred polyvinyl alcohols or partially hydrolyzed polyvinyl acetates are those for which the viscosity of a 4% strength by weight aqueous solution at 20° C. in accordance with DIN 53015 has a value in the range from 3 to 56 mPa*s, preferably a value of 14 to 45 mPa*s, in particular of 22 to 41 mPa*s. Preferred polyvinyl alcohols have a degree of hydrolysis of 65%, preferably 70%, in particular ≥75%.

Organic anionic protective colloids are sodium alginate, polymethacrylic acid and its copolymers, the copolymers of sulfoethyl acrylate and methacrylate, of sulfopropyl acrylate and methacrylate, of N-(sulfoethyl)maleimide, of 2-acrylamido-2-alkylsulfonic acids, of styrenesulfonic acid, and of vinylsulfonic acid. Preferred organic anionic protective colloids are naphthalenesulfonic acid and naphthalenesulfonic acid-formaldehyde condensates, and, in particular, polyacrylic acids and phenolsulfonic acid-formaldehyde condensates.

Inorganic protective colloids include what are called Pickering systems, which allow stabilization by means of very fine, solid particles and are insoluble but dispersible in water or are insoluble and nondispersible in water, but are wettable by the lipophilic substance. The mode of action and their use are described in EP-A 1 029 018 and also EP-A 1 321 182, the content of which is hereby expressly incorporated by reference.

A Pickering system may be composed of the solid particles alone, or may additionally be composed of auxiliaries which enhance the dispersibility of the particles in water or enhance the wettability of the particles by the lipophilic phase.

The inorganic solid particles may be metal salts, such as salts, oxides, and hydroxides of calcium, magnesium, iron, zinc, nickel, titanium, aluminum, silicon, barium, and manganese. Included are magnesium hydroxide, magnesium carbonate, magnesium oxide, calcium oxalate, calcium carbonate, barium carbonate, barium sulfate, titanium dioxide, aluminum oxide, aluminum hydroxide, and zinc sulfide. Silicates, bentonite, hydroxyapatite, and hydrotalcites may likewise be mentioned. Particular preference is given to highly disperse silicas, magnesium pyrophosphate, and tricalcium phosphate.

The Pickering systems may either first be added to the water phase or else added to the stirred oil-in-water emulsion. Certain fine, solid particles are prepared by precipitation, as described in EP-A 1 029 018, and also in EP-A 1 321 182.

The highly disperse silicas can be dispersed as fine, solid particles in water. An alternative option is to use what are known as colloidal dispersions of silica in water. Such colloidal dispersions are alkaline, aqueous mixtures of silica. In the alkaline pH range the particles are swollen and are stable in water. For the use of these dispersions as a Pickering system it is advantageous for the pH of the oil-in-water emulsion to be adjusted with an acid to a pH of 2 to 7.

In general the protective colloids are used in amounts of 0.1% to 15% by weight, preferably from 0.5% to 10% by weight, based on the water phase. For inorganic protective colloids it is preferred to choose amounts of 0.5% to 15% by weight, based on the water phase. Organic protective colloids are used preferably in amounts of 0.1% to 10% by weight, based on the water phase of the emulsion.

In one embodiment preference is given to inorganic protective colloids and also to mixtures thereof with organic protective colloids.

In another embodiment preference is given to organic neutral protective colloids.

Protective colloids which carry OH groups, such as polyvinyl alcohols and partially hydrolyzed polyvinyl acetates, are preferred.

A further possibility for the purpose of costabilization is to add surfactants, preferably nonionic surfactants. Suitable surfactants can be found in the "Handbook of Industrial Surfactants", whose content is hereby expressly incorporated by reference. The surfactants can be used in an amount of 0.01% to 10% by weight, based on the water phase of the emulsion.

Free-radical initiators which can be used for the polymerization reaction that proceeds via a free-radical mechanism include the typical peroxo compounds and azo compounds, appropriately in amounts of 0.2% to 5% by weight, based on the weight of the monomers.

Depending on the aggregate state of the free-radical initiator and on its solubility characteristics, it can be supplied per se, but is preferably supplied as a solution, emulsion or suspension, which allows free-radical initiator to be metered more precisely, particularly when in small quantities.

Preferred free-radical initiators include tert-butyl peroxoneodecanoate, tert-amyl peroxypivalate, dilauroyl peroxide, tert-amyl peroxy-2-ethylhexanoate, 2,2'-azobis(2,4-dimethyl)valeronitrile, 2,2'-azobis(2-methylbutyronitrile), dibenzoyl peroxide, tert-butyl per-2-ethyl hexanoate, di-tert-butyl peroxide, tert-butyl hydroperoxide, 2,5-dimethyl-2,5-di(tert-butylperoxy)hexane, and cumene hydroperoxide.

Particularly preferred free-radical initiators are di(3,5,5-trimethylhexanoyl) peroxide, 4,4'-azobisisobutyronitrile, tert-butyl perpivalate, and dimethyl 2,2-azobisisobutyrate. These initiators have a half-life of 10 hours in a temperature range from 30 to 100° C.

In addition it is possible to add regulators known to the skilled worker to the polymerization, in typical amounts, such as tert-dodecyl mercaptan or ethylhexyl thioglycolate.

The dispersing conditions for the preparation of the stable oil-in-water emulsion are preferably chosen in conventional manner such that the oil droplets have the size of the desired microcapsules. Small capsules, particularly when the size is to be below 50 µm, require homogenizing or dispersing machines, devices which can be provided with or without forced flow means.

The homogenization may take place, furthermore, through the use of ultrasound (e.g., Branson Sonifier II 450). Equipment suitable for ultrasound homogenization includes, for example, that described in GB 2250930 and U.S. Pat. No. 5,108,654.

The capsule size can be controlled via the rotational speed of the dispersing instrument/homogenizing instrument and/or by means of the concentration of the protective colloid and/or by way of its molecular weight, i.e., by way of the viscosity of the continuous aqueous phase, within certain limits. Up to a limiting rotational speed, the size of the dispersed particles decreases as the rotational speed is increased.

It is important in this context that the dispersing equipment be employed at the beginning of capsule formation. In the case of continuously operating devices with forced flow it is advantageous to pass the emulsion through the shearing field a number of times.

The preparation of the emulsion takes place in a temperature range from 10 to 130° C., preferably 30 to 100° C.

The polymerization is generally conducted at 40 to 150° C., preferably at 60 to 120° C. The dispersion temperature and polymerization temperature should of course lie above the melting temperature of the lipophilic substances.

In general the polymerization is conducted at 20 to 100° C., preferably at 40 to 95° C. Depending on the desired lipophilic substance, the oil-in-water emulsion should be formed at a temperature at which the core material is liquid/oily. It is necessary correspondingly to choose a free-radical initiator whose decomposition temperature is above this temperature and likewise to carry out the polymerization at 2 to 50° C. above this temperature, so that, if desired, free-radical initiators chosen are those whose decomposition temperature lies above the melting point of the lipophilic substance.

One common process variant for lipophilic substances having a melting point of up to about 60° C. is a reaction temperature which to begin with is 60° C. and which is increased in the course of the reaction to 85° C. Advantageous free-radical initiators have a 10-hour half-life in the range from 45 to 65° C., such as tert-butyl perpivalate.

According to a further process variant, for lipophilic substances with a melting point above 60° C., a temperature program is chosen that begins at correspondingly higher reaction temperatures. For starting temperatures around 85° C., preference is given to free-radical initiators having a 10-hour half-life in the range from 70 to 90° C., such as tert-butyl per-2-ethylhexanoate.

The polymerization is appropriately performed under atmospheric pressure, although it is also possible to operate under reduced or slightly elevated pressure, as for example in the case of a polymerization temperature above 100° C., in other words, for instance, in the range from 0.5 to 5 bar.

The reaction times of the polymerization amount normally to 1 to 10 hours, usually to 2 to 5 hours.

One inventive process variant using polyvinyl alcohol and/or partially hydrolyzed polyvinyl acetate permits an advantageous procedure in accordance with which dispersion and polymerization are carried out directly at an elevated temperature.

Subsequent to the actual polymerization reaction, at a conversion of 90% to 99% by weight, it is in general advantageous to make the aqueous microcapsule dispersions largely free from odoriferous substances, such as residual monomers and other volatile organic constituents. This can be done in a known way physically, by means of distillative removal (in particular via steam distillation) or by stripping with an inert gas. It may also take place chemically, as described in WO 99/24525, advantageously by means of redox-initiated polymerization, as described in DE-A 44 35 423, DE-A 44 19 518 and DE-A 44 35 422.

In this way it is possible to produce microcapsules having an average particle size in the range from 0.5 to 100 µm, the particle size being adjustable in conventional manner via the shearing force, the stirring speed, and the protective colloid and its concentration. Preferred microcapsules are those having an average particle size in the range from 0.5 to 50 µm, preferably 0.5 to 30 µm (Z-average by means of light scattering). In accordance with the process of the invention it is possible to prepare microcapsule dispersions having a microcapsule content of 5% to 50% by weight. The microcapsules are individual capsules.

The average particle diameter is the weight-average particle diameter, determined by quasielastic, dynamic light scattering. A particular advantage is the very narrow size distribution of the capsules.

The microcapsules of the invention can be processed preferably directly as an aqueous dispersion. Spray drying to a microcapsule powder is generally possible, but is usually carried out under gentle conditions.

The microcapsules of the invention in the embodiment with encapsulated flavors and fragrances are suitable for the treatment of packaging. The microencapsulation of the flavors or fragrances significantly lowers their rates of evaporation. In this way it is possible to affix them durably to a location, such as on the surface of a cardboard pack, and to release them only later, deliberately, by means of a radiation pulse. One possible application is the treatment of packaging whose contents are to be heated in a microwave, with microcapsules comprising flavors or fragrances. Irradiation within the microwave deliberately releases the flavors and/or fragrances.

In one embodiment, microcapsules of the invention with catalysts and/or inhibitors as the lipophilic substance are suitable for use in chemical synthesis or in polymerization.

The microcapsules of the invention are suitable, furthermore, for the construction of blocking-resistant coatings on paper, cardboard, wood, etc., it being possible for the contents of the capsules to be released therefrom under radiation induction. More particularly they are suitable for producing coatings comprising compounds a) to p) which if unencapsulated would form a film of liquid or oil. A further possibility is to mix substances in encapsulated form with one another which otherwise would react directly with one another. In this context it is possible to encapsulate either one or else both reaction components. As a result of the deliberately initiated radiation-induced opening, in contrast, the reaction can be controlled.

The microcapsules of the invention with a lipophilic substance of group k) or l) are suitable for adhesive systems such as multicomponent adhesives. The microcapsules of the invention with crosslinkers k) as core material likewise have the abovementioned properties of blocking resistance and controllable reactivity, and are especially suitable as crosslinkers for polymer systems, particularly as crosslinkers for aqueous polymers, preferably for polymer dispersions. This may be exemplified for carbodiimides.

The polymers to be crosslinked preferably comprise acid groups, more preferably carboxylic acid groups. These acid groups crosslink with the carbodiimide groups. The microcapsules are suitable, for example, as crosslinkers for aqueous polyurethane dispersions or aqueous dispersions of polymers obtainable by free-radical polymerization (preferably by emulsion polymerization), and also, in particular, mixtures thereof.

This may be exemplified for epoxide-containing crosslinkers:

The polymers to be crosslinked preferably comprise functional groups which via a nucleophilic opening of the epoxide are able to react with it. Particular preference is given to primary or secondary amine groups, hydroxyl groups or acid groups, more preferably carboxylic acid groups. The microcapsules are suitable, for example, as crosslinkers for aqueous polyurethane dispersions or aqueous dispersions of polymers obtainable by free-radical polymerization (preferably by emulsion polymerization), and also, in particular, mixtures thereof.

The microcapsules are suitable as crosslinkers in adhesives, paints, varnishes, paper-coating slips or other coating or impregnating compositions.

With particular preference the microcapsules are used as crosslinkers in adhesives, more preferably aqueous adhesives. Adhesives of this kind comprise at least one polymeric binder and, if desired, additives such as fillers, thickeners, defoamers, dyes, pigments, etc.

The polymeric binder is preferably a polyurethane, a free-radically polymerized polymer, or mixtures thereof. The polymeric binders are preferably in the form of aqueous dispersions. Suitable polyurethane or free-radically polymerized polymer includes in particular the polyurethane dispersions or emulsion polymers that are described in WO 03/068703 and DE 10 2004 063 380.

The microcapsules are applied in the form of a dispersion in a hydrophilic solvent, preferably as an aqueous dispersion. This dispersion may be admixed if appropriate with further effect substances, such as slip additives, adhesion promoters, flow control agents, film-forming assistants, flame retardants, corrosion inhibitors, waxes, siccatives, matting agents, deaerating agents, thickeners, and water-soluble biocides, for example.

In the case of a two-component adhesive, the adhesive comprises the polymeric binder and the microcapsules. For this purpose the polymeric binder is preferably in the form of an aqueous dispersion. Suitable polymeric binders are described in more detail below in the context of the pressure sensitive adhesives having microencapsulated epoxy tackifier resins. Further additives, and the microcapsules, can be added easily to the aqueous dispersion of the polymeric binder.

The amount of microcapsules is preferably 0.1 to 40 parts by weight, more preferably 0.2 to 20 parts by weight, very preferably 0.5 to 10 parts by weight per 100% by weight of adhesive (solids, without water or other constituents that are liquid at 21° C. and 1 bar).

The tackifier resins for crosslinking are preferably pressure-sensitive adhesives or laminating adhesives. Laminating adhesives, and more particularly their various applications, are common knowledge to the skilled worker and are described, for example, in DE 10 330 749, DE 4308079, and DE 19 916 663, hereby incorporated by reference.

According to one preferred embodiment it is possible to add further abovementioned IR or microwave absorbers to the microcapsule dispersion in order to increase the absorption. In this case it is possible for these to be the absorbers used specifically in encapsulation, or else a different absorber. In contrast to the encapsulated absorbers, these absorbers are present in free dispersion in the continuous phase.

The present invention further provides a method of releasing a lipophilic substance by irradiating the microcapsules of the invention with electromagnetic radiation selected from the wavelength range from 700 nm to 1 m. This method can be utilized in accordance with the lipophilic substance. In the case of tackifier resins I), tackifying resins I) or crosslinkers k) as lipophilic substance, the microcapsules of the invention can be utilized in an adhesive bonding method.

The present invention accordingly further provides a method of adhesively bonding at least two substrates which comprises applying to the surface of at least one substrate at least one crosslinker k) and a tackifier resin I) and/or a tackifying resin I), of which at least one is in the form of microcapsules of the invention, and subjecting the substrates, before, during or after their joining, to irradiation with radiation in the wavelength range of the absorption of the absorber; in the case of irradiation after the joining of the substrates, at least one of the substrates must be at least partly transparent to the radiation.

To produce the coatings the microcapsule dispersions can be applied to the substrates that are to be coated; in other words, the solvent is removed subsequently by suitable methods. It is possible, in accordance with the invention, to apply a nontacky microcapsule dispersion extensively or locally and, through targeted irradiation of individual regions, to release the adhesive only at those points.

Suitability for the introduction of energy and hence release of the adhesives is possessed by alternating electromagnetic fields. These fields may be produced, for example, using lamps which emit a high fraction of IR radiation, infrared hasers, or microwave generators such as klystrons or magnetrons.

A list of suitable lasers may be given by way of example as follows:

gas lasers such as $CO_2$ lasers (wavelength 9.6 μm or 10.6 μm), helium neon lasers (HeNe lasers, wavelength 632.8 nm), and krypton ion lasers, (647.1 nm strongest line; 676.4 nm; 752.5 nm; 799.3 nm);

dye lasers solid-state lasers such as Nd:YAG lasers (1064 nm), Nd:glass lasers (1061 nm), titanium:sapphire laser (tunable 670-1100 nm), and fiber lasers (erbium, ytterbium or neodymium doped; 0.7 μm to 3 μm) and also semiconductor lasers (700 nm to 4 μm).

The wavelengths of the IR radiation used are situated preferably within a range >700 nm to 2000 nm. Wavelengths of 9.6 μm and 10.6 μm are highly suitable. For NIR/IR irradiation, preference is given to a power density of 1-100 W/cm$^2$, preferably 1-40 W/cm$^2$, with an irradiation time of 0.01-20 s.

The frequency of the microwave radiation used is situated preferably within a range from 500 MHz to 25 GHz. Thus, for example, it is possible to use electromagnetic radiations of the so-called ISM sectors (Industrial Scientific and Medical Applications), in which the frequencies lie between 100 MHz and 200 GHz. Further details on alternating electromagnetic fields in the microwave range are described in Kirk Othmer, "Encyclopedia of Chemical technology", 2nd edition, volume 15, "Micro-wave technology" section, hereby incorporated by reference.

Preferred layer thicknesses for both IR and microwave irradiation are, for example, 1 to 500 μm, more preferably 5 to 300, very preferably 10 to 100 μm. Thicker layers are possible in principle, but generally decrease in their radiation transparency as they become deeper.

Preferred laminating foils are polymer films, metal foils, nonwovens made of synthetic or natural fibers, coated or uncoated paper, or else veneers or real or imitation wood. These foils are typically applied to a nonflexible substrate such as a molding.

In the case of the adhesive bonding method, however, it is possible more particularly for the flexible substrate to also be coated with adhesive. The coating may take place by typical application methods. Coating is followed by drying at room temperature or temperatures up to 80° C. or temperatures above 80° C. for an appropriately shorter time. The drying is preferably carried out at room temperature or temperatures up to 80° C. Subsequently, in order to remove water or other solvents; the coated flexible substrate can be laminated on.

The amount of adhesive applied (to the flexible or nonflexible substrate) is preferably 0.5 to 500 g/m$^2$, more preferably 0.5 to 300 g/m$^2$, very preferably 2 to 300 g/m$^2$, especially 2 to 200 g/m$^2$, above all 10 to 250 g/m$^2$ and most preferably 10 to 100 g/m$^2$.

The amount of adhesive applied can be applied in a direct or indirect process to one or both sides of the flexible or nonflexible substrate.

The adhesive-coated substrate may be stored virtually ad infinitum, e.g., over a number of weeks and months. The coated substrate is storage-stable; that is, even after a storage time of several weeks, the coated substrate can be processed with the same good results.

The microcapsule-comprising adhesives of the invention allow full-surface as well as local bonding. In the latter case, this means that the radiation energy for the release from the capsules is introduced locally, with structure and focus. This makes it possible primarily to effect uniform application of encapsulated substance, which is generally easy to accomplish.

For adhesive bonding, the parts to be bonded are irradiated locally and joined, or joined first and then irradiated locally. This is subject to the same provisions as those described above.

Adhesive bonding takes place preferably under pressure, for which purpose it is possible for the parts to be bonded to be pressed together with a pressure of 0.05 to 50 N/mm$^2$, for example.

The assemblies obtained have good performance properties, such as good adhesion and high internal strength, even in the case of long storage times of the microcapsule dispersions of the invention.

The present invention further provides microcapsules comprising a capsule core, comprising at least one epoxy tackifier resin and if appropriate a compound which absorbs the elec tromagnetic radiation from the wavelength range from 700 nm to 1 m, and a capsule wall composed of 40% to 90% by weight of one or more monomers (monomers I) selected from $C_1$-$C_{24}$ alkyl esters of acrylic and/or methacrylic acid, acrylic acid, methacrylic acid, and maleic acid, 0% to 60% by weight of one or more difunctional or polyfunctional monomers (monomers II) which are insoluble or sparingly soluble in water, and 0% to 40% by weight of one or more other monomers (monomers III), based in each case on the total weight of the monomers, and also a method of producing them, adhesive systems comprising these microcapsules, and an adhesive bonding method.

The present invention additionally provides microcapsules comprising a capsule core, comprising at least one epoxy tackifier resin, and a capsule wall composed of 40% to 90% by weight of one or more monomers (monomers I) selected from $C_1$-$C_{24}$ alkyl esters of acrylic and/or methacrylic acid, acrylic acid, methacrylic acid, and maleic acid, 0% to 60% by weight of one or more difunctional or polyfunctional monomers (monomers II) which are insoluble or sparingly soluble in water, and 0% to 40% by weight of one or more other monomers (monomers III), based in each case on the total weight of the monomers, with the proviso that the capsule core comprises no compound which absorbs electromagnetic radiation from the wavelength range from 700 nm to 1 m, and also a method of producing them, adhesive systems comprising these microcapsules, and an adhesive bonding method.

The epoxy tackifier resins encapsulated in accordance with the invention are referred to as resins on account of their molecular weight. Their mode of action, described below, however, is closer to that of a crosslinker. Epoxy tackifier resins are described in the book by C. A. May, "Epoxy resins" second edition, Marcel Dekker, Inc. Suitable epoxy resins are diepoxy or polyepoxy resins, especially those having a weight-average molecular weight ≤25 000 g/mol.

Difunctional or polyfunctional epoxy resins of this kind, and methods of producing them, are known to the skilled worker. In general they are obtained by reaction of epichlorohydrin with compounds having two or more terminal reactive hydrogens. By way of example, mention may be made of epoxy tackifier resins which are obtainable by reacting epichlorohydrin with bisphenol A, with novolak resins, with carboxylic acids or with aliphatic alcohols, in each case. The latter are referred to as glycidyl ethers. Preferred epoxy resins include resins based on bisphenol A/epichlorohydrin, and also epoxide acrylate resins.

The resins synthesized from bisphenol A and epichlorohydrin have, as a general rule, average molecular weights in the range from 500 g/mol to 1000 g/mol, preferably 600 g/mol to 800 g/mol, and are available, for example, under the name Araldite® from Huntsman International LLC.

Additionally preferred as epoxy tackifier resins are styrene/(meth)acrylate copolymers with epoxide groups, which are obtained by polymerizing (meth)acrylates which carry one or more epoxide radicals with styrene monomers and, if appropriate, with further, nonfunctionalized (meth)acrylate monomers. Additionally preferred as epoxy tackifier resins are (meth)acrylate copolymers with epoxide groups, which are obtained by polymerizing (meth)acrylates which carry one or more epoxide radicals with further, nonfunctionalized (meth)acrylate monomers. The term (meth)acrylate here embraces both acrylate and methacrylate monomers.

Suitability in accordance with the invention is possessed both by methacrylate monomers with epoxide radicals and by acrylate monomers with epoxide radicals. Examples of monomers with 1,2-epoxide radicals include glycidyl acrylate and glycidyl methacrylates. Further suitable epoxy-functionalized monomers are allyl glycidyl ether, glycidyl ethacrylates, and glycidyl itaconates.

Suitable nonfunctionalized acrylate monomers and methacrylate monomers for epoxy tackifier resins comprise methyl acrylate, ethyl acrylate, n-propyl acrylate, isopropyl acrylate, n-butyl acrylate, s-butyl acrylate, isobutyl acrylate, t-butyl acrylate, n-amyl acrylate, isoamyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, n-propyl methacrylate, n-butyl methacrylate, isopropyl methacrylate, isobutyl methacrylate, s-butyl methacrylate, t-butyl methacrylate, n-amyl methacrylate, n-hexyl methacrylate, isoamyl methacrylate, isobornyl acrylate, n-hexyl acrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, and isobornyl methacrylate.

Preferred nonfunctionalized acrylate comonomers and methacrylate comonomer comprise butyl acrylate, butyl methacrylate, methyl methacrylate, isobutyl methacrylate, cyclohexyl acrylate, cyclohexyl methacrylate, isobornyl acrylate, and isobornyl methacrylate, and mixtures thereof.

Suitable styrene monomers comprise styrene, α-methylstyrene, vinyltoluene, p-methylstyrene, t-butylstyrene, o-chlorostyrene, vinylpyridine, and mixtures thereof. Preferred styrene monomers are styrene and α-methylstyrene.

In one embodiment according to the invention the epoxy tackifier resin comprises 50%-80% by weight, based on the total weight of the monomers, of at least one (meth)acrylate monomer which carries epoxide groups, and 20%-50% by weight of one or more styrene monomers, in copolymerized form. In another embodiment the epoxy tackifier resin comprises 25%-50% by weight of at least one (meth)acrylate monomer which carries epoxide groups, 15%-30% by weight of at least one styrene monomer, and 20%-60% by weight of at least one nonfunctionalized methacrylate and/or acrylate monomer, in copolymerized form. In a further preferred embodiment the epoxy tackifier resin comprises 50%-80% by weight of at least one (meth)acrylate monomer which carries epoxide groups, 15%-45% by weight of at least one styrene monomer, and 0%-5% by weight of at least one nonfunctionalized methacrylate monomer and/or acrylate monomer, in copolymerized form. In a further preferred embodiment the epoxy tackifier resin comprises 15%-45% by weight of at least one (meth)acrylate monomer which carries epoxide groups and 55-85% by weight of at least one nonfunctionalized methacrylate monomer and/or acrylate monomer, in copolymerized form.

The epoxy tackifier resins may be characterized by their chemical and physical properties such as their molecular weight, their epoxide equivalent weight (EEW), their number-average epoxide functionality (Efn), and their weight-average epoxide functionality (Efw). Suitable in accordance with the invention are epoxy tackifier resins having low to very high EEW values. Suitability is possessed, for example, by epoxy tackifier resins which have an EEW in the range from 180 to 2800, an average molecular weight (Mw) of $\leq 25\,000$, an Efn of $\leq 30$, and an Efw of $\leq 140$.

Epoxy tackifier resins are obtained by widely known preparation methods. Such methods comprise continuous polymerization processes, batch processes, and semibatch processes. Methods suitable for the epoxy tackifier resins mentioned are described in the U.S. patent applications Ser. No. 09/354,350 and Ser. No. 09/614,402 and in U.S. Pat. No. 6,346,590, the disclosure content of which is hereby incorporated by reference.

Preferred epoxy acrylate resins are available under the name Joncryl® ADR from BASF SE.

The monomers I, II, and III are those specified above, more particularly those specified as being preferred.

The polymers of the capsule wall of the microcapsules with an epoxy tackifier resin core comprise in general at least 40%, in a preferred form at least 50%, in a particularly preferred form at least 60%, and also up to 90%, by weight, of one or, preferably, two or more monomers I selected from $C_1$-$C_{24}$ alkyl esters of acrylic and/or methacrylic acid, acrylic acid, methacrylic acid and/or maleic acid, in copolymerized form, based on the total weight of the monomers.

These monomers I comprise preferably 5% to 70% by weight, more particularly up to 50% by weight, based on the total amount of the monomers I, of at least one monomer Ia.

The polymers of the capsule wall of the microcapsules with an epoxy tackifier resin core comprise in general at least 10%, in a preferred form at least 15%, in a particularly preferred form at least 20%, and also up to 60%, by weight, preferably up to 50% by weight, of one or more difunctional or polyfunctional monomers (monomers II) which are insoluble or sparingly soluble in water, in copolymerized form, based on the total weight of the monomers.

Besides these, the polymers may comprise in copolymerized form up to 40%, preferably up to 30%, more particularly up to 20%, by weight, of other monomers III. With particular preference they comprise less than 5% by weight of other monomers III in copolymerized form. With very particular preference the capsule wall is composed solely of the monomers I and II.

Preferably the capsule wall of the microcapsules with an epoxy tackifier resin core is composed essentially of 40% to 90% by weight of one or more monomers (monomers I) selected from $C_1$-$C_{24}$ alkyl esters of acrylic and/or methacrylic acid, acrylic acid, methacrylic acid, and maleic acid, 0% to 60% by weight of one or more difunctional or polyfunctional monomers (monomers II) which are insoluble or sparingly soluble in water, and 0% to 40% by weight of one or more other monomers (monomers III), based in each case on the total weight of the monomers, the monomers I comprising 10% to 90% by weight, based on the total amount of the monomers I, of at least one monomer Ia whose homopolymer has a glass transition temperature ($T_g$) of $\leq 60°$ C., preferably 20° C., more preferably 5-20° C.

The microcapsules with an epoxy tackifier resin core are produced as described above by what is called an in situ polymerization, especially in accordance with the preferred procedure. The method uses the abovementioned auxiliaries such as protective colloids, surfactants if appropriate, free-radical initiators, and, if appropriate, regulators, more particularly those specified as being preferred in each case. Accordingly it is possible, as described above, after the polymerization reaction, largely to free the microcapsule dispersions from odoriferous substances.

In this way it is possible to produce microcapsules with an epoxy tackifier resin core that have an average particle size in the range from 0.5 to 100 μm, the particle size being adjustable in a conventional manner via the shearing force, the stirring speed, the protective colloid, and its concentration. Preference is given to microcapsules having an average particle size in the range from 0.5 to 50 µm, preferably 0.5 to 30 µm (Z-average by means of light scattering). According to the method of the invention it is possible to produce microcapsule dispersions having a microcapsule content of 5% to 50% by weight. The microcapsules are—as already described above—individual capsules.

The microcapsules of the invention comprising an epoxy tackifier resin are suitable as crosslinkers for adhesives, especially pressure-sensitive adhesives, paints, varnishes, paper-coating slips or other coating or impregnating compositions. The microcapsules of the invention comprising an epoxy tackifier resin are especially suitable for adhesive systems such as multicomponent adhesives. The epoxide groups crosslink the other components of the adhesive system. With particular preference they are used in aqueous adhesive systems.

The polymers of the pressure-sensitive adhesive that are to be crosslinked comprise, preferably, functional groups which are able to react with the epoxide via nucleophilic opening of the epoxide, and also the microcapsules of the invention. Preference is given to primary or secondary amine groups, hydroxyl groups or, with particular preference, acid groups, especially carboxylic acid groups. The microcapsules act, for example, as crosslinkers for aqueous polyurethane dispersions or aqueous dispersions of polymers obtainable by free-radical polymerization (preferably by emulsion polymerization), more particularly of acrylate dispersions, and also mixtures thereof.

The polymer of the aqueous dispersion to be used in accordance with the invention for pressure-sensitive adhesives comprises functional groups which are able to react with the epoxide by nucleophilic opening, such as carboxylic, sulfonic or phosphonic acid group. Carboxylic acid groups are preferred. Functional groups of this kind can be incorporated by polymer-analogous reactions, but preferably directly by copolymerization of ethylenically unsaturated compounds which carry these functional groups, preferably ethylenically unsaturated compounds which carry acid groups (also referred to below as acid monomers). Examples of acid monomers include acrylic acid, methacrylic acid, itaconic acid, maleic acid or fumaric acid. The pressure-sensitive adhesives of the invention comprise essentially an aqueous acrylate dispersion comprising acrylate monomers and acid monomers, and microcapsules comprising epoxy tackifier resin.

The amount of these acid monomers copolymerized in the polymer is preferably 0.05% to 8%, more preferably 0.5% to 7%, and very preferably 1% to 5%, by weight, based on the polymer.

The aqueous dispersions, more particularly acrylate dispersions, are synthesized by free-radical emulsion polymerization of ethylenically unsaturated compounds, especially acrylates, and comonomers which carry acid groups (acid monomers). The emulsion polymer is composed preferably to an extent of at least 40%, more preferably at least 60%, very preferably at least 80%, by weight, of what are referred to as principal monomers.

The principal monomers are selected from $C_1$-$C_{20}$ alkyl (meth)acrylates, vinyl esters of carboxylic acids comprising up to 20 C atoms, vinyl aromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers.

Examples include (meth)acrylic acid alkyl esters having a $C_1$-$C_{10}$ alkyl radical, such as methyl methacrylate, methyl acrylate, n-butyl acrylate, ethyl acrylate, and 2-ethylhexyl acrylate.

Also suitable in particular are mixtures of the (meth)acrylic acid alkyl esters.

Vinyl esters of carboxylic acids having 1 to 20 C atoms are, for example, vinyl laurate, vinyl stearate, vinyl propionate, Versatic acid vinyl esters, and vinyl acetate.

Suitable vinyl aromatic compounds include vinyltoluene, α- and p-methylstyrene, α-butylstyrene, 4-n-butylstyrene, 4-n-decylstyrene, and, preferably, styrene. Examples of nitriles are acrylonitrile and methacrylonitrile.

The vinyl halides are chloro-, fluoro- or bromo-substituted ethylenically unsaturated compounds, preferably vinyl chloride and vinylidene chloride.

Examples of vinyl ethers include vinyl methyl ether or vinyl isobutyl ether. Preference is given to vinyl ethers of alcohols comprising 1 to 4 C atoms.

Hydrocarbons having 2 to 8 C atoms and one or two olefinic double bonds include ethylene, propylene, butadiene, isoprene, and chloroprene.

Preferred principal monomers are the $C_1$ to $C_{10}$ alkyl acrylates and methacrylates, more particularly $C_1$ to $C_8$ alkyl acrylates and methacrylates, and vinyl aromatics, especially styrene, and mixtures thereof.

Very particular preference is given to methyl acrylate, methyl methacrylate, ethyl acrylate, n-butyl acrylate, n-hexyl acrylate, octyl acrylate, and 2-ethylhexyl acrylate, styrene, and mixtures of these monomers.

Besides the principal monomers, the polymer may be composed of further monomers, such as monomers comprising hydroxyl groups, more particularly $C_1$-$C_{10}$ hydroxyalkyl (meth)acrylates, and (meth)acrylamide.

As further monomers mention may also be made of phenyloxyethyl glycol mono(meth)acrylate, glycidyl acrylate, glycidyl methacrylate, and amino (meth)acrylates such as 2-aminoethyl (meth)acrylate.

As further monomers mention may also be made of crosslinking monomers.

With particular preference the polymer is composed of at least 40%, more particularly at least 60%, and very preferably of at least 80%, by weight, of $C_1$-$C_{20}$, more particularly $C_1$-$C_{10}$, alkyl (meth)acrylates.

Emulsion polymerization involves polymerizing ethylenically unsaturated compounds (monomers) in water, using ionic and/or nonionic emulsifiers and/or protective colloids or stabilizers as surface-active compounds to stabilize the monomer droplets and the polymer particles formed subsequently from the monomers.

A detailed description of suitable protective colloids for the preparation of the aqueous polymer dispersion is found in Houben-Weyl, Methoden der organischen Chemie, Volume XIV/1, Makromolekulare Stoffe [Macromolecular Compounds], Georg-Thieme-Verlag, Stuttgart, 1961, pp. 411 to 420. Suitable emulsifiers include anionic, cationic, and nonionic emulsifiers. As surface-active substances it is preferred to use emulsifiers, whose molecular weights, unlike those of the protective colloids, are usually below 2000 g/mol. Suitable emulsifiers are described in WO 2006/136574, hereby incorporated by reference. Suitable emulsifiers for preparing the aqueous polymer dispersion are likewise found in Houben-Weyl, Methoden der organischen Chemie, Volume 14/1, Makromolekulare Stoffe, Georg Thieme Verlag, Stuttgart, 1961, pages 192 to 208.

Examples of emulsifier trade names include Dowfax 2 A1, Emulan NP 50, Dextrol OC 50, Emulgator 825, Emulgator 825 S, Emulan OG, Texapon NSO, Nekanil 904 S, Lumiten I-RA, Lumiten E 3065, Disponil FES 77, Lutensol AT 18, Steinapol VSL, and Emulphor NPS 25.

The emulsifier is used typically in amounts of 0.1% to 10% by weight, based on the monomers to be polymerized.

In the emulsion polymerization use is generally made of water-soluble initiators for the free-radical polymerization of the monomers. Suitable initiators are water-soluble initiators such as ammonium salts and alkali metal salts of peroxodisulfuric acid, an example being sodium peroxodisulfate, hydrogen peroxide or organic peroxides, an example being tert-butyl hydroperoxide, and also what are known as reduction-oxidation (redox) initiator systems.

Suitable initiators for the emulsion polymerization, and also their quantities, are known to the skilled worker and are described in, for example, WO 2006/136574, hereby incorporated by reference.

Furthermore it is possible to add polymerization regulators, or regulators for short, to the emulsion polymerization, these regulators being used in order to bring about a chain termination reaction and to control the molecular weight. Regulators, like mercapto compounds, are general knowledge to the skilled worker and can be added in typical amounts, as described in WO 2006/136574, hereby incorporated by reference.

The following applies to the procedure for the emulsion polymerization:

The emulsion polymerization takes place in general at 30 to 130° C., preferably 50 to 90° C. The polymerization medium may be composed either of water alone or of mixtures of water and water-miscible liquids such as methanol. It is preferred to use just water. The polymerization can be conducted as a feed process in a staged or gradient procedure. Preference is given to a feed process, in which a portion of the polymerization mixture is introduced as an initial charge, heated to the polymerization temperature, and its polymerization commenced, and then the remainder of the polymerization mixture is supplied to the polymerization zone, typically by way of two or more spatially separate feed streams, of which one or more comprise the monomers in pure form or in emulsified form, this addition being made continuously, in stages or under a concentration gradient, and polymerization being maintained during said addition. In the polymerization it is also possible to include a polymer seed in the initial charge, in order, for example, to set the particle size more effectively.

Preferably not more than 30% by weight of the total amount of the monomers, more preferably not more than 20% by weight, very preferably not more than 10% by weight, of the monomers are included in the initial charge to the polymerization vessel. The remaining monomers, i.e., preferably at least 70% by weight, more preferably at least 80% by weight, very preferably at least 90% by weight, are added continuously during the polymerization. The addition of the monomers to the polymerization vessel is made preferably over a period of at least two hours, more preferably at least three hours. The individual components may be added to the reactor, in the case of the feed process, from above, at the side, or from below, through the reactor base.

The manner in which the initiator is added to the polymerization vessel in the course of the free-radical aqueous emulsion polymerization is known to a person of ordinary skill in the art. It may either be included in its entirety in the initial charge to the polymerization vessel, or else introduced, continuously or in stages, at the rate at which it is consumed in the course of the free-radical aqueous emulsion polymerization. In each specific case this will depend both on the chemical nature of the initiator system and on the polymerization temperature. It is preferred to include a portion in the initial charge and to supply the remainder to the polymerization zone at the rate at which it is consumed.

The initiator is usually used in the form of an aqueous solution, the lower concentration being determined by the amount of water that is acceptable in the dispersion, and the upper concentration by the solubility of the respective compound in water. In general the concentration is 0.1% to 30% by weight of initiator, preferably 0.5% to 20% by weight, more preferably 1.0% to 10% by weight, based on the solution.

In order to remove the residual monomers it is common to add initiator after the end of the actual emulsion polymerization as well, i.e., after a monomer conversion of at least 95%.

Aqueous acrylate dispersions with solids contents of 15% to 75% by weight, preferably of 40% to 75% by weight, are selected. Methods of modifying the solids content are known to the skilled worker and are also described in WO 2006/136574, hereby incorporated by reference.

The glass transition temperature of the polymer is preferably −60 to 0° C., more preferably −60 to −10° C., and very preferably −60 to −20° C. The glass transition temperature may be determined by typical methods such as differential thermoanalysis or differential scanning calorimetry (see, for example, ASTM 3418/82, midpoint temperature).

Aqueous acrylate dispersions of this kind that are suitable in accordance with the invention for pressure-sensitive adhesives (PSAs) are known and are available under the ACRONAL® brands from BASF SE.

The pressure-sensitive adhesive (PSA) of the invention comprises the aqueous acrylate dispersion and the microcapsules of the invention with epoxy tackifier resin. The microcapsule content is preferably 0.1 to 20 parts by weight, more preferably 0.2 to 10 parts by weight, of microcapsules, and very preferably 0.5 to 5 parts by weight of microcapsules, based on the solids content of the dispersion to be crosslinked, preferably of the aqueous acrylate dispersion.

The PSA may further comprise one or more additives selected from tackifiers, thickeners, preferably associative thickeners, defoamers, plasticizers, pigments, wetting agents, and fillers.

Tackifiers are tackifying resins, as described in Adhesive Age, July 1987, pages 19-23 or Polym. Mater. Sci. Eng. 61 (1989), pages 588-592. Examples include natural resins, such as rosins and their derivatives formed by disproportionation or isomerization, polymerization, dimerization and/or hydrogenation. They may be present in their salt form (with, for example, monovalent or polyvalent counterions (cations)) or, preferably, in their esterified form. Alcohols used for the esterification may be monohydric or polyhydric. Examples are methanol, ethanediol, diethylene glycol, triethylene glycol, 1,2,3-propanetriol, and pentaerythritol.

Also used, furthermore, are hydrocarbon resins, examples being coumarone-indene resins, polyterpene resins, hydrocarbon resins based on unsaturated CH compounds, such as butadiene, pentene, methylbutene, isoprene, piperylene, divinylmethane, pentadiene, cyclopentene, cyclopentadiene, cyclohexadiene, styrene, α-methylstyrene, and vinyltoluene, as tackifiers.

Other compounds increasingly being used as tackifiers include polyacrylates which have a low molar weight. These polyacrylates preferably have a weight-average molecular weight Mw below 30 000. The polyacrylates with preference are composed of at least 60%, more particularly at least 80%, by weight of $C_1$-$C_8$ alkyl(meth)acrylates.

Preferred tackifiers are natural or chemically modified rosins. Rosins are composed predominantly of abietic acid or derivatives of abietic acid.

The tackifiers can be added in a simple way to the polymers of the invention, preferably to the aqueous dispersions of the polymers. In this case the tackifiers are preferably themselves in the form of an aqueous dispersion.

The amount by weight of the tackifiers is preferably 5 to 100 parts by weight, more preferably 10 to 50 parts by weight, based on 100 parts by weight of polymer of the acrylate dispersion (solids/solids).

For improved surface wetting, the PSAs may comprise, in particular, wetting assistants, examples being fatty alcohol ethoxylates, alkylphenol ethoxylates, sulfosuccinic esters, nonylphenol ethoxylates, polyoxyethylenes/propylenes or sodium dodecylsulfonates. The amount is generally 0.05 to 5 parts by weight, in particular 0.1 to 3 parts by weight, per 100 parts by weight of polymer of the acrylate dispersion (solids).

The microcapsules, preferably in the form of a microcapsule dispersion, are mixed with the polymer dispersion, a polyurethane dispersion, for example, or, preferably, an above-described acrylate dispersion, or mixtures thereof.

The PSAs are suitable for producing self-adhesive articles such as labels, sheets or adhesive tapes. The PSA can be applied by typical methods, such as, for example, by rolling, knifecoating, spreading, etc., to backings, examples being paper or polymeric films, composed preferably of polyethylene, polypropylene, which may be biaxially or monoaxially stretched, polyethylene terephthalate, polyvinyl chloride, polystyrene, polyamide or metal. Also suitable in particular are backings having nonpolar surfaces, made for example of polyolefins, especially polyethylene or polypropylene, since the dispersions of the invention adhere well to such backings.

The water can be removed preferably by drying at 50 to 150° C. Before or after the adhesive is applied, the backings may be slit to form adhesive tapes, labels or sheets.

For subsequent use, the PSA-coated side of the substrates may be lined with a release paper, as for example with a siliconized paper.

The self-adhesive articles of the invention have very good adhesive properties, in particular an effective adhesion to the substrates and a high level of cohesion (internal strength in the layer of adhesive).

The invention therefore also provides a method of adhesively bonding at least two substrates which comprises applying to the surface of at least one substrate at least one pressure-sensitive adhesive of the invention and, after the substrates have been joined, heating the bond site.

Heating takes place in general to a temperature in the range from 30 to 200° C., preferably 50 to 100° C. The duration of heating, dependent on the temperature, is at least 1 minute. After this time, solidification can already be observed. This heating may take place in a controlled way or not until the bonded articles are in use, when they are subject to temperature fluctuations. The PSA of the invention is suitable for applications involving continual, repeated exposures to high temperatures, as may occur, for example, as a result of solar irradiation in the interior of an automobile, or by the heating of an engine. No softening of the bond site is observed. Instead, the occurrence of relatively high temperatures effects the solidification.

The adhesive systems of the invention exhibit advantageous performance properties. As a result of the acrylate dispersion, the workpieces are bonded and, as a result of subsequent heating, the bond site is solidified in accordance with the invention. Furthermore, the coated adhesives exhibit good water resistance.

EXAMPLES

Example 1

(Model System with Dye to Demonstrate the Opening of the Capsule Wall by Means of IR Radiation)

Water Phase 540.71 g DI water (DI=fully deionized water)

35 g a 10% strength by weight aqueous polyvinyl alcohol solution (Mowiol 15/79 from Kuraray Europe GmbH, viscosity of the 4% strength by weight solution at 20° C.: 15 mPas according to DIN 53015, and a degree of hydrolysis 79%)

140 g a 5% strength by weight aqueous methylhydroxypropylcellulose solution (Culminal MHPC 100, Hercules GmbH)

Oil Phase 10.47 g 1,4-butanediol diacrylate 24.43 g methyl methacrylate 314.12 g diisopropylnaphthalene 0.94 g Pergascript Red I 6 B (Ciba Specialty Chemicals)

0.04 g Lumogen IR 788 (BASF Aktiengesellschaft)

Addition 1

2.33 g a 75% strength by weight solution of tert-butyl perpivalate in aliphatic hydrocarbons Feed 1

8.05 g a 10% strength by weight aqueous solution of tert-butyl hydroperoxide

Feed 2

25.46 g a 1.8% strength by weight aqueous solution of ascorbic acid a) The water phase above was introduced at room temperature. The oil phase was added and the mixture was dispersed with a high-speed dissolver stirrer at 5000 rpm. 30 minutes of dispersion gave a stable emulsion.

b) Following the introduction of addition 1, the reaction batch was subjected to the following temperature program: heating to 60° C. in 60 minutes, continuous raising of the temperature from 60 to 70° C. over a period of 120 minutes, increased to 85° C. over the course of 30 minutes, and holding of this temperature for 60 minutes. Thereafter feed 1 was added and, in the course of cooling to room temperature, feed 2 was run in over the course of 60 minutes.

This gave a dispersion having a solids content of 29.9% by weight with an average particle size (D50) of 5.62 μm (z-average determined by means of light scattering).

Example 2

(without IR Absorber—not Inventive)

The procedure of Example 1 was repeated with the difference that no IR absorber was added.

This gave a dispersion having a solids content of 31% by weight with an average particle size (D50) of 4.56 μm (z-average determined by means of light scattering).

Example 3

(Model System with Dye in Order to Demonstrate the Opening of the Capsule Wall by Means of IR Radiation)

The procedure of Example 1 was repeated with the difference that 0.07 g of Lumogen This gives a dispersion having a solids content of 30.2% by weight with an average particle size (D50) of 5.03 μm (z-average from light scattering).

Example 4

Water Phase 540.71 g DI water 35 g a 10% strength by weight aqueous polyvinyl alcohol solution (Mowiol 15/79)

140 g a 5% strength by weight aqueous methylhydroxypropylcellulose solution (Culminal MHPC 100, Hercules GmbH)
Oil Phase
5.23 g 1,4-butanediol diacrylate
8.72 g methyl methacrylate
3.49 g pentaerythritol triacrylate
331.3 g diisopropylnaphthalene
0.27 g 2-ethylhexyl thioglycolate
0.99 g Pergascript Red I 6 B
0.04 g Lumogen IR 788
Addition 1
1.17 g a 75% strength by weight solution of tert-butyl perpivalate in aliphatic hydrocarbons
Feed 1
8.05 g a 10% strength by weight aqueous solution of tert-butyl hydroperoxide
Feed 2
25.46 g a 1.8% strength by weight aqueous solution of ascorbic acid a) The water phase above was introduced at room temperature. The oil phase was added and the mixture was dispersed with a high-speed dissolver stirrer at 5000 rpm. 30 minutes of dispersion gave a stable emulsion.

b) Following the introduction of addition 1, the reaction batch was subjected to the following temperature program: heating to 60° C. in 60 minutes, continuous raising of the temperature from 60 to 70° C. over a period of 120 minutes, increased to 85° C. over the course of 30 minutes, and holding of this temperature for 60 minutes. Thereafter feed 1 was added and, in the course of cooling to room temperature, feed 2 was run in over the course of 60 minutes.

This gave a dispersion having a solids content of 32.7% by weight with an average particle size (D50) of 4.06 µm (z-average determined by means of light scattering).

Example 5

Water Phase
540.71 g DI water
35 g a 10% strength by weight aqueous polyvinyl alcohol solution (Mowiol 15/79)
140 g a 5% strength by weight aqueous methylhydroxypropylcellulose solution (Culminal MHPC 100, Hercules GmbH)
Oil Phase
10.47 g 1,4-butanediol diacrylate
24.43 g methyl methacrylate
300.59 g diisopropylnaphthalene
13.56 g Lanthanum boride (LaB$_6$; CAS 12008-21-8; powder, particle size<1 µm)
0.95 g Pergascript Red I 6 B
Addition 1
2.33 g a 75% strength by weight solution of tert-butyl perpivalate in aliphatic hydrocarbons
Feed 1
8.05 g a 10% strength by weight aqueous solution of tert-butyl hydroperoxide
Feed 2
25.46 g a 1.8% strength by weight aqueous solution of ascorbic acid An emulsion was prepared and polymerized in the same way as in Example 1. This gave a dispersion having a solids content of 32.9% by weight with an average particle size (D50) of 6.11 µm (z-average from light scattering).

Example 6

Water Phase
540.71 g DI water
35 g a 10% strength by weight aqueous polyvinyl alcohol solution (Mowiol 15/79)
140 g a 5% strength by weight aqueous methylhydroxypropylcellulose solution (Culminal MHPC 100, Hercules GmbH)
Oil Phase
10.47 g 1,4-butanediol diacrylate
24.43 g methyl methacrylate
310.56 g diisopropylnaphthalene 3.5 g iron(II, III) oxide (Magnetpigment 346 from BASF AG, particle size<1 µm)
0.95 g Pergascript Red 16 B
Addition 1
2.33 g a 75% strength by weight solution of tert-butyl perpivalate in aliphatic hydrocarbons
Feed 1
8.05 g a 10% strength by weight aqueous solution of tert-butyl hydroperoxide
Feed 2
25.46 g a 1.8% strength by weight aqueous solution of ascorbic acid An emulsion was prepared and polymerized in the same way as in Example 1. This gave a dispersion having a solids content of 28.8% by weight with an average particle size (D50) of 6.83 µm (z-average from light scattering).

Use Examples 1-6

The microcapsule dispersions obtained from Examples 1-6 were each applied using a doctor blade to a glass plate coated with silica gel, giving homogeneous films after drying. To destroy the capsule wall, these films were then irradiated with a titanium/sapphire laser (wavelength: 773 nm; power density: 20 W/cm$^2$). The release of the capsule contents, which is the evidence of the destruction of the capsule wall, is indicated by the leuco base Pergascript Red I 6B, which is protonated by the acidic silica gel and thereby takes on a red color.

The results of this irradiation test are summarized in Table 1. The coloring of the silica gel plate was assessed visually.
0: no coloration
1: slight red coloration
2: strong red coloration.
Reported are the intensity of the coloration prior to irradiation, $I_0$, and n seconds after irradiation, $I_n$.

TABLE 1

| Sample | Coloration $I_0$ | Coloration $I_n$ | Irradiation time n [sec] |
|---|---|---|---|
| Example 1 | 1 | 2 | 1 |
| Example 2 | 0 | 0 | 10 |
| Example 3 | 0 | 2 | <1 |
| Example 4 | 0 | 1-2 | 30 |
| Example 5 | 0 | 2 | 1 |
| Example 6 | 0 | 2 | 5 |

The examples which follow describe the release of adhesive base materials.

Example 7

Water Phase
331.4 g DI water
70 g a 10% strength by weight aqueous polyvinyl alcohol solution (Mowiol 15/79)
140 g a 5% strength by weight aqueous methylhydroxypropylcellulose solution (Culminal MHPC 100, Hercules GmbH)

1.34 g a 2.5% strength by weight aqueous solution of sodium nitrite

Oil Phase 314 g 1-chloro-2,3-epoxypropane-4,4'-isopropylidenebisphenol polymer with a viscosity of 500-700 mPas (at 25° C.) (Araldite 506, CAS: 25068-38-6, Sigma Aldrich Coop.)

10.5 g 1,4-butanediol diacrylate 24.5 g methyl methacrylate 0.04 g Lumogen IR 788

0.95 g Pergascript Red I 6 B

Addition 1

2.33 g a 75% strength by weight solution of tert-butyl perpivalate in aliphatic hydrocarbons Feed 1

3.5 g a 10% strength by weight aqueous solution of tert-butyl hydroperoxide

Feed 2

17.3 g a 1.1% strength by weight aqueous solution of ascorbic acid a) 314 g of 1-chloro-2,3-epoxypropane-4,4'-isopropylidenebisphenol polymer with a viscosity of 500-700 mPas (at 25° C.) (Araldite 506) were charged to a 2 l vessel, and the constituents of the water phase and also the monomers and absorber were added. This mixture was then dispersed with a high-speed dissolver stirrer at 6000 rpm. 20 minutes of dispersion gave a stable emulsion.

b) Following the introduction of addition 1, the reaction batch was subjected to the following temperature program: heating to 60° C. in 60 minutes, continuous raising of the temperature from 60 to 70° C. over a period of 120 minutes, increased to 85° C. over the course of 30 minutes, and holding of this temperature for 60 minutes. Thereafter feed 1 was added and, in the course of cooling to room temperature, feed 2 was run in over the course of 60 minutes.

This gave a dispersion having a solids content of 36.3% by weight with an average particle size (D50) of 2.43 µm (z-average determined by means of light scattering).

Example 8

Water Phase 291.9 g DI water 40 g a 10% strength by weight aqueous polyvinyl alcohol solution (Mowiol 15/79)

80 g a 5% strength by weight aqueous methylhydroxypropylcellulose solution (Culminal MHPC 100, Hercules GmbH)

0.76 g a 2.5% strength by weight aqueous solution of sodium nitrite

Oil Phase 179.4 g 1-chloro-2,3-epoxypropane-4,4'-isopropylidenebisphenol polymer with a viscosity of 500-700 mPas (at 25° C.) (Araldite 506)

1 g methacrylic acid 5.85 g methyl methacrylate 3 g pentaerythritol tetraacrylate 0.02 g Lumogen IR 788

0.54 g Pergascript Red I 6 B 10 g hexadecane 0.16 g 2-ethylhexyl thioglycolate

Addition 1

1.33 g a 75% strength by weight solution of tert-butyl perpivalate in aliphatic hydrocarbons Feed 1

2 g a 10% strength by weight solution of tert-butyl hydroperoxide

Feed 2

18.3 g a 0.6% strength by weight aqueous solution of ascorbic acid

An emulsion was prepared and polymerized in the same way as in Example 7. This gave a dispersion having a solids content of 29% by weight with an average particle size (D50) of 6.37 µm (z-average from light scattering).

Example 9

Water Phase 344.19 g DI water 46 g a 10% strength by weight aqueous polyvinyl alcohol solution (Mowiol 15/79)

92 g a 5% strength by weight aqueous methylhydroxypropylcellulose solution (Culminal MHPC 100, Hercules GmbH)

0.88 g a 2.5% strength by weight aqueous solution of sodium nitrite

Oil Phase 206.4 g Araldite 506

13.68 g methyl methacrylate 1.8 g n-butyl acrylate 6.9 g butanediol diacrylate 0.02 g Lumogen IR 788

0.62 g Pergascript Red I 6 B

Addition 1

1.53 g a 75% strength by weight solution of tert-butyl perpivalate in aliphatic hydrocarbons Feed 1

2.3 g a 10% strength by weight aqueous solution of tert-butyl hydroperoxide

Feed 2

11.33 g a 1.1% strength by weight aqueous solution of ascorbic acid

An emulsion was prepared and polymerized in the same way as in Example 7.

This gave a dispersion having a solids content of 30% by weight with an average particle size (D50) of 6.27 µm (z-average from light scattering).

Example 10

Water Phase 321.1 g DI water 44 g a 10% strength by weight aqueous polyvinyl alcohol solution (Mowiol 15/79)

88 g a 5% strength by weight aqueous methylhydroxypropylcellulose solution (Culminal MHPC 100, Hercules GmbH)

0.84 g a 2.5% strength by weight aqueous solution of sodium nitrite

Oil Phase 197.4 g Araldite 506

7.7 g methyl methacrylate 3.3 g butanediol diacrylate 0.02 g Lumogen IR 788

0.59 g Pergascript Red I 6 B 11 g hexadecane

Addition 1

1.47 g a 75% strength by weight solution of tert-butyl perpivalate in aliphatic hydrocarbons Feed 1

2.2 g a 10% strength by weight aqueous solution of tert-butyl hydroperoxide

Feed 2
20.12 g a 1.1% strength by weight aqueous solution of ascorbic acid

An emulsion was prepared and polymerized in the same way as in Example 7. This gave a dispersion having a solids content of 29.4% by weight with an average particle size (D50) of 2.39 µm (z-average from light scattering).

Example 11

Water Phase
321.1 g DI water
44 g a 10% strength by weight aqueous polyvinyl alcohol solution (Mowiol 15/79)
88 g a 5% strength by weight aqueous methylhydroxypropylcellulose solution (Culminal MHPC 100, Hercules GmbH)
0.84 g a 2.5% strength by weight aqueous solution of sodium nitrite
Oil Phase
186.38 g liquid, acrylate-based chain extender for polyester resins (MW 3300, glass transition temperature −41° C., Joncryl ADR 4380, BASF SE)
2.24 g methacrylic acid
11.43 g methyl methacrylate
6.04 g butanediol diacrylate
1.96 g n-butyl acrylate
0.02 g Lumogen IR 788
0.59 g Pergascript Red I 6 B
11 g hexadecane
0.34 g 2-ethylhexyl thioglycolate
Addition 1
1.47 g a 75% strength by weight solution of tert-butyl perpivalate in aliphatic hydrocarbons
Feed 1
2.2 g a 10% strength by weight aqueous solution of tert-butyl hydroperoxide
Feed 2
20.12 g a 0.6% strength by weight aqueous solution of ascorbic acid An emulsion was prepared and polymerized in the same way as in Example 7. This gave a dispersion having a solids content of 29% by weight with an average particle size (D50) of 4.58 µm (z-average from light scattering).

Example 12

Water Phase
321.1 g DI water
44 g a 10% strength by weight aqueous polyvinyl alcohol solution (Mowiol 15/79)
88 g a 5% strength by weight aqueous methylhydroxypropylcellulose solution (Culminal MHPC 100, Hercules GmbH)
0.84 g a 2.5% strength by weight aqueous solution of sodium nitrite
Oil Phase
191.8 g Joncryl ADR 4380
1.68 g methacrylic acid
8.56 g methyl methacrylate
1.47 g n-butyl acrylate
4.53 g pentaerythritol tetraacrylate
0.02 g Lumogen IR 788
0.59 g Pergascript Red I 6 B
11 g hexadecane
0.26 g 2-ethylhexyl thioglycolate
Addition 1
1.47 g a 75% strength by weight solution of tert-butyl perpivalate in aliphatic hydrocarbons
Feed 1
2.2 g a 10% strength by weight aqueous solution of tert-butyl hydroperoxide
Feed 2
20.12 g a 0.6% strength by weight aqueous solution of ascorbic acid An emulsion was prepared and polymerized in the same way as in Example 7. This gave a dispersion having a solids content of 30.4% by weight with an average particle size (D50) of 15.25 µm (z-average from light scattering).

Example 13

Water Phase
437.9 g DI water
60 g a 10% strength by weight aqueous polyvinyl alcohol solution (Mowiol 15/79)
120 g a 5% strength by weight aqueous methylhydroxypropylcellulose solution (Culminal MHPC 100, Hercules GmbH)
1.15 g a 2.5% strength by weight aqueous solution of sodium nitrite
Oil Phase
254.16 g Joncryl ADR 4380
3.05 g methacrylic acid
15.58 g methyl methacrylate
2.67 g n-butyl acrylate
8.24 g butanediol diacrylate
0.03 g Lumogen IR 788
0.81 g Pergascript Red I 6 B
15 g hexadecane
0.47 g 2-ethylhexyl thioglycolate
Addition 1
2 g a 75% strength by weight solution of tert-butyl perpivalate in aliphatic hydrocarbons
Feed 1
3 g a 10% strength by weight aqueous solution of tert-butyl hydroperoxide Feed 2
27.27 g a 0.6% strength by weight aqueous solution of ascorbic acid An emulsion was prepared and polymerized in the same way as in Example 7. This gave a dispersion having a solids content of 33.4% by weight with an average particle size (D50) of 8.86 µm (z-average from light scattering).

Use Examples 7-13 (Activation by NIR Laser and Microwave)

The microcapsule dispersions obtained by Examples 7-13 were each applied by means of a doctor blade to a glass support. Homogeneous films were obtained after drying. To improve the absorption of radiation, the microcapsule dispersions of Examples 7 to 13 were additionally admixed with a 1% or 5% by weight aqueous dispersion of carbon blacks (Lepton® Black, from BASF SE).

a) Release by IR irradiation

To destroy the capsule wall, the films were then irradiated with a titanium/sapphire laser (wavelength: 773 nm; power density: 20 W/cm$^2$). In a serial test, 5 points on the plate were irradiated for different lengths of time. This was followed by a visual and tactile assessment to gauge the irradiation time from which the contents were released. The irradiated and released point had a slight gloss and an oily feel. The respective minimum irradiation times can be found in the table below.

The results of this irradiation test are summarized in Table 2, carbon black (Lepton Black) having been added in different amounts to the dispersion for the purpose of better absorption of radiation.

TABLE 2

Release of epoxy tackifier resin

| | Minimum irradiation time [sec] after addition of | |
|---|---|---|
| | 1% Lepton | 5% Lepton |
| Example 7 | 10 | 1 |
| Example 8 | >10 | 5 |
| Example 9 | >10 | 10 |
| Example 10 | 10 | 1 |
| Example 11 | 5-10 | 5 |
| Example 12 | 5-10 | 10 |
| Example 13 | 10 | 1 | b) Release by Microwave Irradiation

To release the contents by means of microwave radiation, sections of the coated glass measuring 10 cm$^2$ were irradiated in a microwave (power 300 watts, 7 l volume) for 2-minutes.

To improve the absorption of radiation, the microcapsule dispersions of Examples 7 to 13 were additionally admixed with a 1% or 5% by weight aqueous dispersion of carbon blacks (Lepton Black).

The results are summarized in Table 3.

TABLE 3

Release of the epoxy tackifier resin

| | Result of microwave irradiation (power density: 300 W/7 l for 2 minutes) | | |
|---|---|---|---|
| | 0% Lepton | 1% Lepton | 5% Lepton |
| Example 7 | oily | oily | oily |
| Example 8 | no reaction | no reaction | no reaction |
| Example 9 | oily | oily | oily |
| Example 10 | oily | oily | slightly oily |
| Example 11 | no reaction | slightly oily | slightly oily |
| Example 12 | no reaction | oily | oily |
| Example 13 | oily | oily | oily |

Examples Relating to the Formation of Microcapsules without Absorbers

Example 14

Water Phase
321.13 g DI water
44 g a 10% strength by weight aqueous polyvinyl alcohol solution (Mowiol 15/79)
88 g a 5% strength by weight aqueous methylhydroxypropylcellulose solution (Culminal MHPC 100, Hercules GmbH)
0.84 g a 2.5% strength by weight aqueous solution of sodium nitrite
Oil Phase
192.50 g liquid acrylate-based chain extender for polyester resins (MW 3300, glass transition temperature −41° C. (Joncryl ADR 4380, BASF SE))
1.47 g methacrylic acid
8.57 g methyl methacrylate
4.53 g pentaerythritol triacrylate
11 g hexadecane
0.26 g 2-ethylhexyl thioglycolate
1.68 g n-butyl acrylate
Addition 1
1.47 g a 75% strength by weight solution of tert-butyl perpivalate in aliphatic hydrocarbons
Feed 1
2.20 g a 10% strength by weight aqueous solution of tert-butyl hydroperoxide
Feed 2
20.12 g a 0.6% strength by weight aqueous solution of ascorbic acid An emulsion was prepared and polymerized in the same way as in Example 7. This gave a dispersion having a solids content of 33% by weight with an average particle size (D50) of 11.26 μm (z-average from light scattering).

Example 15

Water Phase
321.13 g DI water
44 g a 10% strength by weight aqueous polyvinyl alcohol solution (Mowiol 15/79)
88 g a 5% strength by weight aqueous methylhydroxypropylcellulose solution (Culminal MHPC 100, Hercules GmbH)
0.84 g a 2.5% strength by weight aqueous solution of sodium nitrite
Oil Phase
203.50 g liquid acrylate-based chain extender for polyester resins (MW 3300, glass transition temperature −41° C. (Joncryl ADR 4380, BASF SE))
1.49 g methacrylic acid
8.70 g methyl methacrylate
4.60 g pentaerythritol triacrylate
1.71 g n-butyl acrylate
Addition 1
1.47 g a 75% strength by weight solution of tert-butyl perpivalate in aliphatic hydrocarbons
Feed 1
2.20 g a 10% strength by weight aqueous solution of tert-butyl hydroperoxide
Feed 2
20.12 g a 0.6% strength by weight aqueous solution of ascorbic acid An emulsion was prepared and polymerized in the same way as in Example 7. This gave a dispersion having a solids content of 33% by weight with an average particle size (D50) of 16.02 μm (z-average from light scattering).

Example 16

Water Phase
321.13 g DI water
44 g a 10% strength by weight aqueous polyvinyl alcohol solution (Mowiol 15/79)
88 g a 5% strength by weight aqueous methylhydroxypropylcellulose solution (Culminal MHPC 100, Hercules GmbH)
0.84 g a 2.5% strength by weight aqueous solution of sodium nitrite
Oil Phase
203.50 g liquid acrylate-based chain extender for polyester resins (MW 3300, glass transition temperature −41° C. (Joncryl ADR 4380, BASF SE))
2.07 g methacrylic acid
12.07 g methyl methacrylate
2.37 g n-butyl acrylate Addition 1

1.47 g a 75% strength by weight solution of tert-butyl perpivalate in aliphatic hydrocarbons Feed 1

2.20 g a 10% strength by weight aqueous solution of tert-butyl hydroperoxide

Feed 2

20.12 g a 0.6% strength by weight aqueous solution of ascorbic acid

An emulsion was prepared and polymerized in the same way as in Example 7. This gave a dispersion having a solids content of 32% by weight with an average particle size (D50) of 10.6 µm (z-average from light scattering).

Example 17

Water Phase 321.13 g DI water 44 g a 10% strength by weight aqueous polyvinyl alcohol solution (Mowiol 15/79)

88 g a 5% strength by weight aqueous methylhydroxypropylcellulose solution (Culminal MHPC 100, Hercules GmbH)

0.84 g a 2.5% strength by weight aqueous solution of sodium nitrite

Oil Phase 203.50 g liquid acrylate-based chain extender for polyester resins (MW 3300, glass transition temperature −41° C. (Joncryl ADR 4380, BASF SE))

1.17 g methacrylic acid 6.80 g methyl methacrylate 7.19 g pentaerythritol triacrylate 1.33 g n-butyl acrylate Addition 1

1.47 g a 75% strength by weight solution of tert-butyl perpivalate in aliphatic hydrocarbons Feed 1

2.20 g a 10% strength by weight aqueous solution of tert-butyl hydroperoxide

Feed 2

20.12 g a 0.6% strength by weight aqueous solution of ascorbic acid

An emulsion was prepared and polymerized in the same way as in Example 7. This gave a dispersion having a solids content of 34% by weight with an average particle size (D50) of 12.23 µm (z-average from light scattering).

Example 18

Water Phase 321.13 g DI water 44 g a 10% strength by weight aqueous polyvinyl alcohol solution (Mowiol 15/79)

88 g a 5% strength by weight aqueous methylhydroxypropylcellulose solution (Culminal MHPC 100, Hercules GmbH)

0.84 g a 2.5% strength by weight aqueous solution of sodium nitrite

Oil Phase 192.50 g high-viscosity acrylate-based chain extender for polyester resins (MW 6000, glass transition temperature −37° C. (Joncryl ADR 4385, BASF SE))

1.47 g methacrylic acid 8.57 g methyl methacrylate 4.53 g pentaerythritol triacrylate 11.0 g hexadecane 0.26 g 2-ethylhexyl thioglycolate 1.68 g n-butyl acrylate Addition 1

1.47 g a 75% strength by weight solution of tert-butyl perpivalate in aliphatic hydrocarbons Feed 1

2.20 g a 10% strength by weight aqueous solution of tert-butyl hydroperoxide

Feed 2

20.12 g a 0.6% strength by weight aqueous solution of ascorbic acid

An emulsion was prepared and polymerized in the same way as in Example 7. This gave a dispersion having a solids content of 31% by weight with an average particle size (D50) of 4.97 µm (z-average from light scattering).

Formulation Examples F1-F8

The acrylate dispersions (A) ACRONAL A225, (B) ACRONAL DS 3579, and (C) ACRONAL DS 3608 were used with the microcapsule dispersions of Examples 12 and 14 to produce the formulations set out in Table 4 below. To produce the formulation, 5% (solids) of the microcapsule dispersion were metered into an initial charge of acrylate dispersion, calculated on a solids basis, and the two components were mixed thoroughly.

TABLE 4

Composition of the formulations of Examples F1-F8

| Formulation Ex. | Microcapsule dispersion (30% form) | | Acrylate dispersion | [g] |
|---|---|---|---|---|
| | Example | [g] | | |
| F1 | Ex. 14 | 10 | ACRONAL A225 | 100 |
| F2 (comparative example) | | 0 | ACRONAL A225 | 100 |
| F3 | Ex. 14 | 9 | ACRONAL DS 3579 | 100 |
| F4 (comparative example) | | 0 | ACRONAL DS 3579 | 100 |
| F5 | Ex. 12 | 9 | ACRONAL DS 3579 | 100 |
| F6 (comparative example) | | 0 | ACRONAL DS 3579 | 100 |
| F7 | Ex. 12 | 8.7 | ACRONAL DS 3608 | 100 |
| F8 (comparative example) | | 0 | ACRONAL DS 3608 | 100 |

Laboratory Coating:

Using a suitable laboratory coating table, the formulation under test was drawn down in the desired film thickness (75 g/m² (solids)) onto the support material or the auxiliary support material and dried in a forced-air drying oven at 90° C. for 3 minutes. After the drying operation, the adhesive side of the coated support material was transferred to the final support material and then lined with release paper. The test strips required were cut from the finished coating with the aid of the cutting stencil, in the coating direction, and stored for at least 16 hours under standard conditions (23° C., 50% relative humidity).

SHEAR Adhesive Failure Test (SAFT)

The release paper was peeled from the test strip and the test strip was placed onto the test substrate by hand, without bubbles and without additional pressure, using a rubber-coated laminating roller. The bonded area was 25 mm×25 mm. Then the test strip was rolled on back and forth twice with an applied pressure of 20 N/mm². After a contact time of 16 hours had passed, the test strip was suspended vertically in the test apparatus of the SAFT Test drying cabinet, and the test weight of 1 kg was affixed to the protruding end of the test strip. The temperature within the chamber was then raised continuously at 0.5° C./min. The SAFT value indicates the temperature at which the test strip tears.

TABLE 5

Performance results of formulation examples F1 to F8

| Formulation Ex. | SAFT value (° C.) |
|---|---|
| F1 | >180 |
| F2 | 118 |
| F3 | >180 |
| F4 | 135 |
| F5 | >180 |
| F6 | 135 |
| F7 | >180 |
| F8 | 115 |

Example 19

Preparation of an Inventively Suitable Acrylate Dispersion

In a 2-liter polymerization reactor with anchor stirrer and heating/cooling equipment, a mixture of 144 g of deionized water and 9.09 g of a 33% by weight aqueous polymer latex (prepared by free-radically initiated emulsion polymerization with styrene) with a weight-average particle diameter $D_{w50}$ of 30 nm was heated to 85° C. under a nitrogen atmosphere.

Feed 1 was an Aqueous Emulsion Prepared From 367 g deionized water 18.75 g a 30% strength by weight aqueous solution of Disponil FES 77 (ethoxylated $C_{12}$-$C_{14}$ Na sulfate)

5.17 g a 58% strength by weight aqueous solution of Lumiten I-SC (succinic ester)

477 g n-butyl acrylate 120 g methyl methacrylate 6 g acrylic acid

Feed 2: 64.3 g of a 7% strength by weight aqueous solution of sodium peroxodisulfate Feed 3: 8.3 g of a 10% strength by weight aqueous solution of t-butyl hydroperoxide Feed 4: 10.2 g of a 12% strength by weight aqueous solution of acetone bisulfite After 2 min, feeds 1 and 2 were started and were metered at a uniform rate over 3 h. After the end of the addition of feeds 1 and 2, the mixture was stirred for 30 minutes. Thereafter, feeds 3 and 4 were started and were metered in at a uniform rate over a period of 60 minutes. After the end of feeds 3 and 4, the internal reactor temperature was lowered to 25° C. The dispersion is adjusted to a pH of 7.5 using ammonia solution. The aqueous polymer dispersion obtained had a solids content of 50% by weight. The average particle size was 200 nm.

The pressure-sensitive adhesive acrylate dispersion obtained can be formulated in the same way as the above formulation examples with the microcapsule dispersions of Examples 12 and 14 to give advantageous pressure-sensitive adhesive dispersions.

The invention claimed is:

1. Microcapsule(s) comprising:
a capsule core comprising at least one epoxy tackifier resin, and a capsule wall comprising in reacted form:
40% to 90% by weight of at least one monomer (monomer I) selected from the group consisting of $C_1$-$C_{24}$ alkyl esters of acrylic acid, $C_1$-$C_{24}$ alkyl esters of methacrylic acid, acrylic acid, methacrylic acid, and maleic acid;
0% to 60% by weight of at least one difunctional or polyfunctional monomer (monomer II) which is insoluble or sparingly soluble in water; and
0% to 40% by weight of at least one other monomer (monomer III), based in each case on total weight of all monomers;
wherein the epoxy tackifier resin is an epoxide acrylate resin that has an average molecular weight of ≤25,000 or a diepoxy or polyepoxy resin that has an average molecular weight of ≤5,000.

2. The microcapsule(s) according to claim 1, wherein the epoxy tackifier resin is an epoxide acrylate resin that has an average molecular weight of ≤25,000.

3. The microcapsule(s) according to claim 1, wherein the epoxy tackifier resin is a diepoxy or polyepoxy resin that has an average molecular weight of ≤5,000.

4. The microcapsule(s) according to claim 1 that comprise an epoxy tackifier resin made by reacting epichlorohydrin with bisphenol A, with a novolak resin, with a carboxylic acid or with an aliphatic alcohol.

5. The microcapsule(s) according to claim 1 comprising an epoxy tackifier resin that comprises styrene/(meth)acrylate copolymers with epoxide groups.

6. The microcapsule(s) according to claim 1 comprising an epoxy tackifier resin that has an EEW in the range from 180 to 2800, an average molecular weight (Mw) of ≤25 000, an Efn of ≤30, and an Efw of ≤140.

7. The microcapsule(s) according to claim 1 with the proviso that the capsule core comprises no compound which absorbs electromagnetic radiation from the wavelength range from 700 nm to 1 m.

8. The microcapsule(s) according to claim 1 that further comprises at least one compound which absorbs electromagnetic radiation from the wavelength range from 700 nm to 1 m.

9. The microcapsule(s) according to claim 1 that further comprises an absorber of electromagnetic radiation in an amount of not more than 10% by weight.

10. The microcapsule(s) according to claim 1, wherein the capsule core further comprises an inorganic IR (infra red) absorber which when applied in a film thickness if 50 μm exhibits an absorption of ≥90% of at least one wavelength ranging from 700 nm to 1 mm; wherein the inorganic IR absorber may be predominantly mixed with the core material, incorporated into the capsule wall, or both.

11. The microcapsule(s) according to claim 1 that further comprise an organic IR (infra red) absorber which when applied in a film thickness if 50 μm exhibits an absorption of ≥90% at least one wavelength within the range of 700 nm to 1 mm; wherein the organic IR absorber may be predominantly mixed with the core material, incorporated into the capsule wall, or both.

12. The microcapsule(s) according to claim 1, wherein the capsule core further comprises an inorganic microwave absorber which absorbs microwaves in the wavelength range of >1 mm to 1 m; wherein the organic IR absorber may be predominantly mixed with the core material, incorporated into the capsule wall, or both.

13. The microcapsule(s) according to claim 1, wherein the capsule core further comprises an organic microwave absorber which absorbs microwaves in the wavelength range of >1 mm to 1 m; wherein the organic IR absorber may be predominantly mixed with the core material, incorporated into the capsule wall, or both.

14. The microcapsule(s) according to claim 1 that release the at least one epoxy tackifier resin after being exposed to heat ranging in temperature from 30 to 200° C.

15. The microcapsule(s) according to claim 1 that further comprises at least one lipophilic substance selected from the group consisting a fragrance, a flavor, an active agent, a dye whose absorption maximum lies at a wavelength <700 nm, and a color former whose absorption maximum lies at a wavelength <700 nm.

16. The microcapsule(s) according to claim 1 that further comprises at least one lipophilic substance that is a tackifying resin selected from the group consisting of a hydrocarbon resin, a modified rosin, a pinene resin and a terpene resin.

17. The microcapsule(s) according to claim 1 that further comprise at least one other lipophilic substance selected from the group consisting an aliphatic hydrocarbon compound, an aromatic hydrocarbon compound, a saturated C6-C30 fatty acid, an unsaturated C6-C30 fatty acid, a fatty alcohol, a C6-C30 fatty amine, a fatty acid ester, a natural wax, a synthetic wax, a halogenated hydrocarbon, a natural oil, and a plasticizer.

18. The microcapsule(s) according to claim 1 that further comprise at least one active agent selected from the group consisting of a biocide, an agent active against endoparasites, an agent active against ectoparasites, a herbicide, a fungicide, an algicide, an agent active against animal pests, an insecticide, an acaricide, a nematicide, a molluscicide, an agent active against mites, and a safener.

19. An aqueous dispersion comprising the microcapsule(s) of claim 1.

20. A powder comprising the microcapsules of claim 1.

21. A coating comprising the microcapsules of claim 1.

22. A coating or other composition produced by exposing the microcapsule(s) of claim 1 to heat or electromagnetic radiation and to release the epoxy tackifier resin.

23. A pressure-sensitive adhesive comprising the microcapsule(s) according to claim 1.

24. A pressure-sensitive adhesive comprising an aqueous acrylate dispersion comprising acrylate monomers and acid monomers and the microcapsule(s) according to claim 1.

25. A pressure-sensitive adhesive according to claim 24, wherein the polymer of the aqueous acrylate dispersion comprises in copolymerized form 0.05% to 8% by weight based on the polymer of acid monomers.

26. A multicomponent adhesive comprising the microcapsule(s) according to claim 1 and at least one other component that is cross-linked by epoxide groups.

27. A two component adhesive comprising the microcapsule(s) of claim 1 and at least one crosslinker for a two-component adhesive selected from the group consisting of an aziridine, an epoxide, an oxazoline, an isocyanate, an oxime, a carbodiimide, an acid, an alcohol, an alkoxylate and an amine.

28. A paint, varnish, paper-coating slip or other coating or impregnating composition comprising the microcapsule(s) according to claim 1.

29. A method for adhesively bonding at least two substrates comprising applying to the surface of at least one substrate at least one adhesive containing the microcapsule(s) according to claim 1, thereby joining the substrates at a bond site, and then subjecting the bond site to heating after the substrates have been joined.

30. A method for producing a self-adhesive article comprising applying an adhesive comprising the microcapsule(s) according to claim 1 to at least one component of an article thereby producing a self-adhesive article.

31. A method for releasing an epoxide tackifier resin comprising irradiating the microcapsule(s) according to claim 1 with electromagnetic radiation in a wavelength range from 700 nm to 1 m.

32. A method of adhesively bonding at least two substrates comprising:
   applying to a surface of at least one substrate at least one crosslinker and at least one epoxy tackifier resin is in the form of the microcapsule(s) according to claim 1 to cause a joining of the substrates, and
   subjecting the substrates, before, during, or after their joining, to irradiation with radiation ranging in wavelength from 10 nm to 1 m,
   wherein when said substrates are irradiated after joining of the substrates, then at least one of the substrates is at least partly transparent to the radiation.

33. A process for preparing the microcapsule(s) according to claim 1, comprising:
   heating an oil-in-water emulsion comprising said monomers, a free-radical initiator, a protective colloid, and the at least one epoxy tackifier resin as a disperse phase.

* * * * *